United States Patent
Suzuki

(10) Patent No.: US 9,742,966 B2
(45) Date of Patent: Aug. 22, 2017

(54) DATA PROCESSING SYSTEM

(71) Applicant: Renesas Electronics Corporation, Koutou-ku, Tokyo (JP)

(72) Inventor: Takayuki Suzuki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 15/333,631

(22) Filed: Oct. 25, 2016

(65) Prior Publication Data

US 2017/0041512 A1   Feb. 9, 2017

Related U.S. Application Data

(63) Continuation of application No. 14/550,386, filed on Nov. 21, 2014, now abandoned, which is a continuation of application No. 13/471,979, filed on May 15, 2012, now Pat. No. 8,923,682.

(30) Foreign Application Priority Data

May 23, 2011   (JP) .................................. 2011-114637

(51) Int. Cl.
  *H04N 5/06* (2006.01)
  *H04N 21/426* (2011.01)
  *H04N 21/43* (2011.01)

(52) U.S. Cl.
  CPC ......... *H04N 5/06* (2013.01); *H04N 21/42607* (2013.01); *H04N 21/4307* (2013.01)

(58) Field of Classification Search
  None
  See application file for complete search history.

(56) References Cited

U.S. PATENT DOCUMENTS

| | | | |
|---|---|---|---|
| 5,508,819 A | 4/1996 | Yanagisawa | |
| 7,526,673 B2 | 4/2009 | Inoue et al. | |
| 2001/0053281 A1* | 12/2001 | Kashiwagi | ............. G11B 20/10 386/201 |

(Continued)

FOREIGN PATENT DOCUMENTS

| | | |
|---|---|---|
| JP | 06-233269 A | 8/1994 |
| JP | 09-305546 A | 11/1997 |

(Continued)

*Primary Examiner* — Eileen Adams
(74) *Attorney, Agent, or Firm* — Foley & Lardner LLP

(57) ABSTRACT

The present invention easily realizes synchronization between processor cores in a multicore system. A data processing system receiving a group of data of different kinds from the outside and performing data processes by kinds includes: a plurality of data process control units corresponding to the kinds of the data group and performing data processes on the data group of corresponding kinds; and a memory unit which can be accessed by the data process control units and has a first region storing a value indicating whether the data process by the data process control units can be executed or not. Each of the data process control units updates the value in the first region on completion of preparation for executing the data process of itself and, when the value in the first region becomes a predetermined value, synchronizes start timings of the data processes and executes the data processes.

16 Claims, 14 Drawing Sheets

(56) References Cited

U.S. PATENT DOCUMENTS

| | | | |
|---|---|---|---|
| 2004/0052275 A1* | 3/2004 | Murakami | G11B 27/034 370/503 |
| 2004/0179511 A1 | 9/2004 | Kizu et al. | |
| 2009/0284653 A1* | 11/2009 | Lee | H04H 60/11 348/462 |
| 2010/0260481 A1 | 10/2010 | Ogawa et al. | |
| 2010/0333164 A1 | 12/2010 | Schultz et al. | |
| 2011/0161976 A1 | 6/2011 | Alexander et al. | |
| 2011/0222715 A1* | 9/2011 | Sato | G01S 5/0284 381/303 |

FOREIGN PATENT DOCUMENTS

| | | |
|---|---|---|
| JP | 10-042254 A | 2/1998 |
| JP | 2004-302837 A | 10/2004 |
| JP | 2006-285724 A | 10/2006 |
| JP | 2009-075948 A | 4/2009 |

* cited by examiner

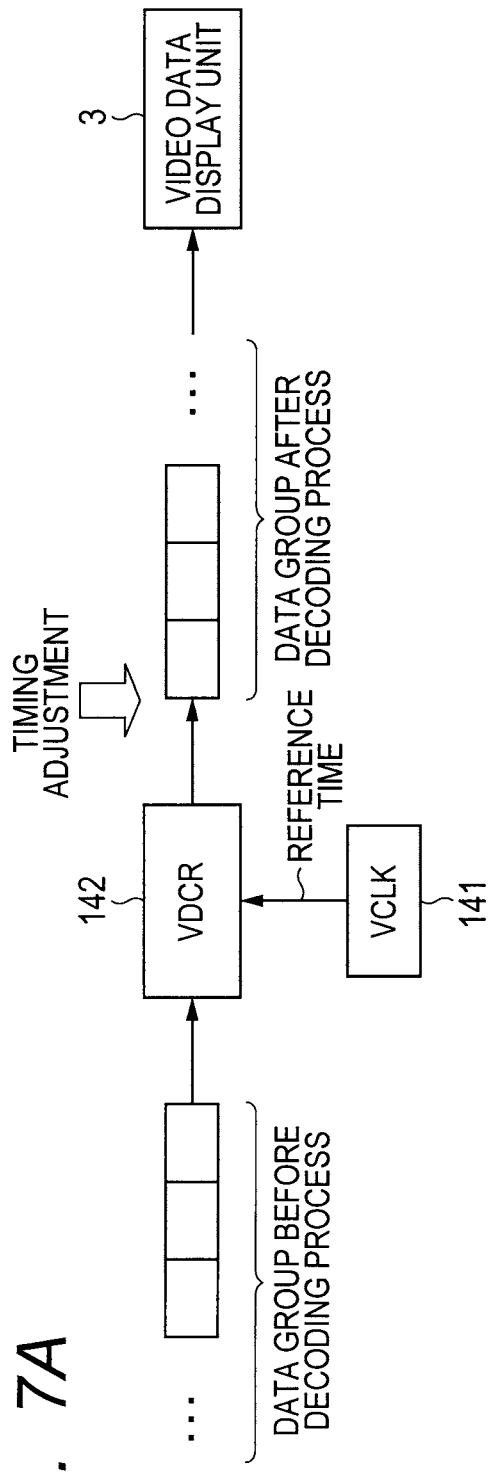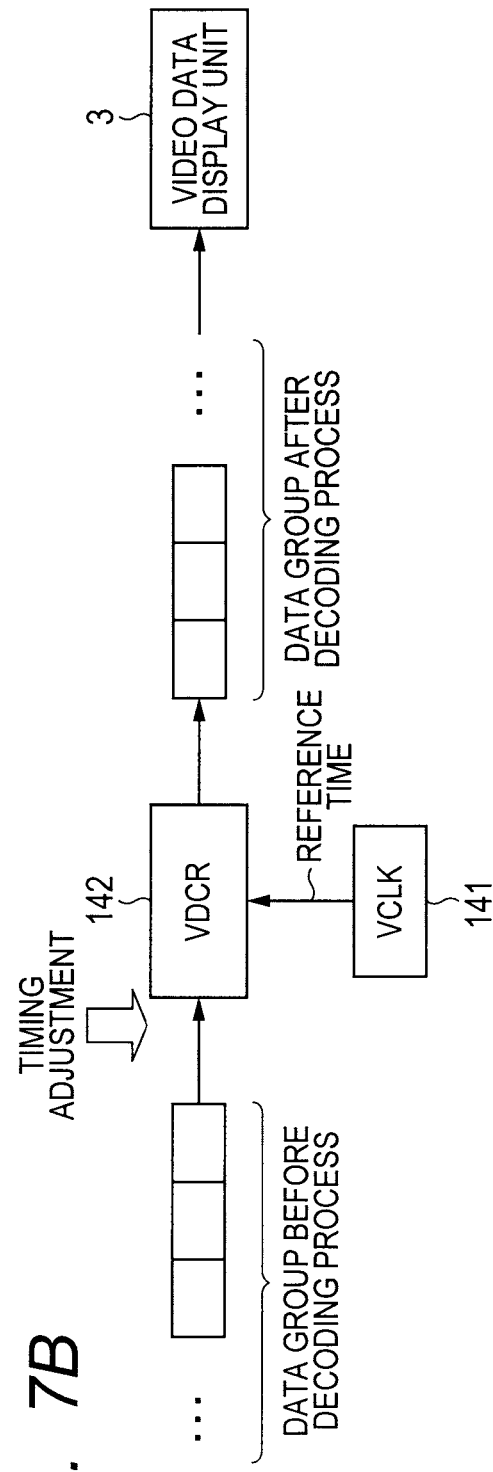

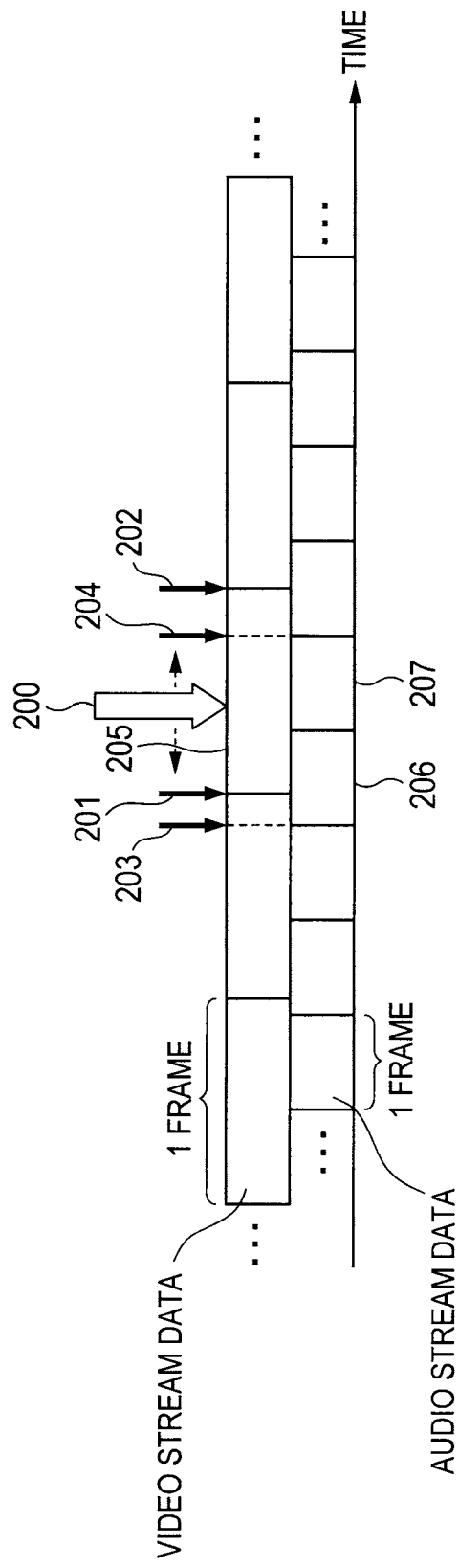

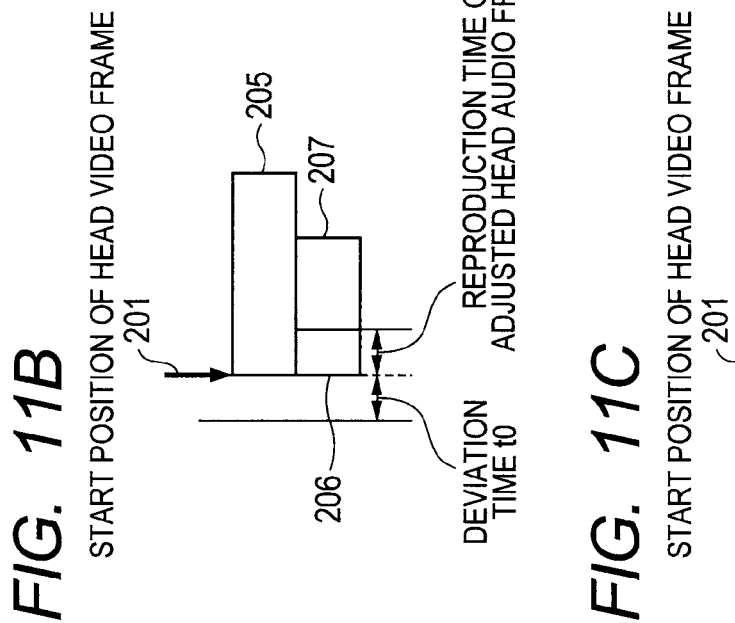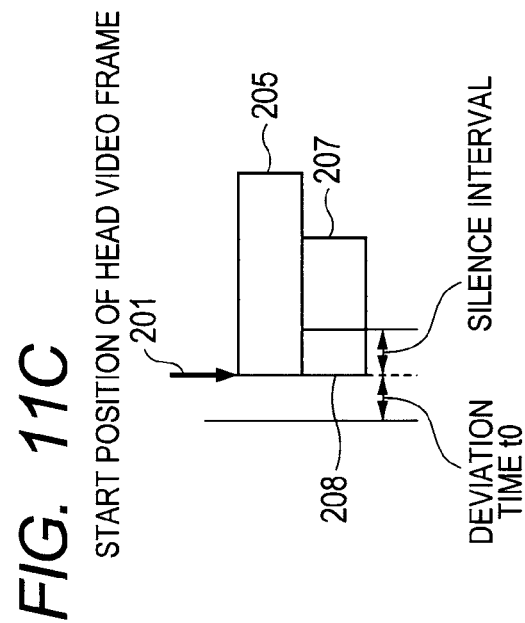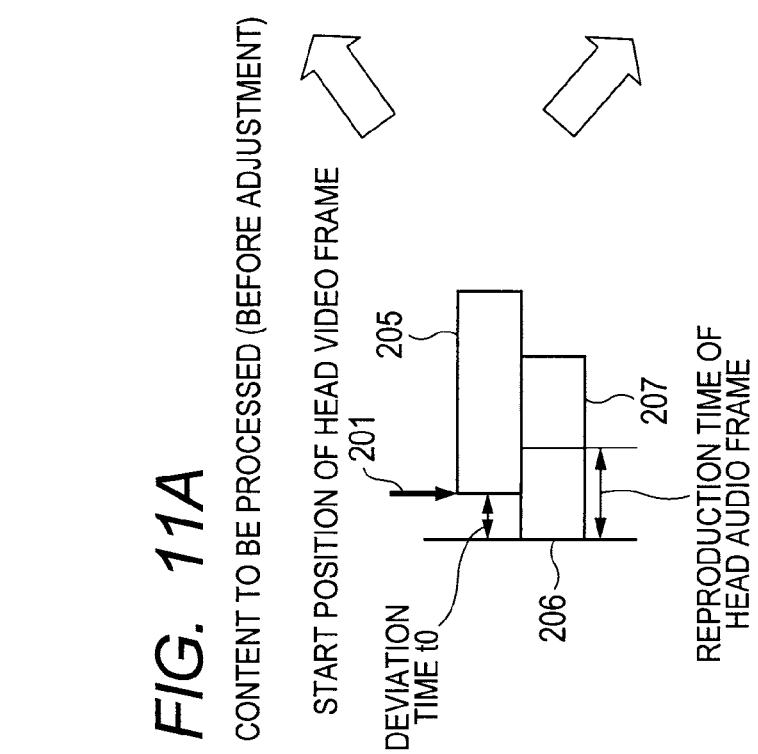

DATA PROCESSING SYSTEM

CROSS-REFERENCE TO RELATED APPLICATIONS

This application is a continuation of U.S. application Ser. No. 14/550,386, filed Nov. 21, 2014, which is a continuation of U.S. application Ser. No. 13/471,979, filed May 15, 2013, now U.S. Pat. No. 8,923,682, which claims benefit of priority from the prior Japanese Application No. 2011-114637, filed on May 23, 2011; the entire contents of all of which are incorporated herein by reference.

BACKGROUND

The present invention relates to a data processing system having a multiprocessor configuration and, more particularly, to a technique effectively applied to a data processing system in which data processes performed by processor cores have to be synchronized.

In a multiprocessor system having a plurality of processor cores, the processor cores execute processes individually, thereby realizing parallelization of the processes, shortening of the process time, and the like. In such a multicore system, depending on a process, a synchronization is necessary among the processor cores. Patent documents 1 to 3 disclose related arts of synchronizing operations of a plurality of processor cores in a multiprocessor system.

Patent document 1 discloses a multiprocessor system in which a synchronizing processor increments or decrements a value in a common region, a processor to be synchronized increments or decrements a value in a local region and, when the value in the common region reaches the value in the local region, the processor to be synchronized starts or restarts process synchronously with operation of the synchronizing processor. Patent document 2 discloses a multicore processor for comparing an address value of a program executed by a synchronizing processor core with an address value of a program executed by a processor core to be synchronized and, according to a result of the comparison, controlling whether the program of the processor core to be synchronized can be executed or not. Patent document 3 discloses an information processor having a configuration in which a plurality of processor cores are coupled in series via a common memory.

As other related arts, patent documents 4 and 5 disclose, not a multiprocessor system, but systems of decoding and reproducing coded data in a moving image including a video image and sound coded. Patent document 4 discloses a method of obtaining a speed difference between a video decoding/reproducing process and an audio decoding/reproducing process by measuring time since completion of audio data decoding/reproducing process until end of process of decoding/reproducing a video frame to be measured in unit time and, according to the process speed difference, adjusting a start timing of a video image decoding/reproducing apparatus, thereby synchronizing the video image and sound. Patent document 5 discloses a method of detecting time stamp information in sound and a video image in compression moving image data and generating an interrupt signal on the basis of the detected information to realize synchronization between sound and a video image.

RELATED ART DOCUMENT

[Patent document 1] Japanese Unexamined Patent Publication No. Hei 09(1997)-305546

[Patent document 2] Japanese Unexamined Patent Publication No. 2006-285724

[Patent document 3] Japanese Unexamined Patent Publication No. 2009-75948

[Patent document 4] Japanese Unexamined Patent Publication No. Hei 06(1994)-233269

[Patent document 5] Japanese Unexamined Patent Publication No. Hei 10 (1998)-42254

SUMMARY

The inventors of the present invention thought that, in the case of realizing a system of reproducing content data of a moving image including a video image and sound in the multicore environment, a decoder for video image data and a decoder for audio data which are centrally controlled by a single processor core in related arts may be controlled by different OSs (Operating Systems) operating on different processor cores. In this case, the possibility that an audio data decoding process and a video data decoding process are controlled by different processor cores is high. In the audio data decoding process and the video data decoding process executed under control of different processor cores, without awareness of synchronization of the processes, the timing of sound output and the timing of a video image displayed are not synchronized, and a moving image may deteriorate.

To a multicore system which reproduces content data of a moving image including a video image and sound, for example, the method disclosed in the patent document 2 can be applied. However, the operation has to be monitored address by address of a program, and there is the possibility that the system configuration is complicated. In the method of the patent document 1, any of the processor cores is set as a synchronizing processor core and the other processor core is set as a processor to be synchronized so that the master-servant relationship among the processor cores is clarified. It is, however, inappropriate to apply the method to a multicore system made of processor cores operating free from the master-servant relationship. Further, the precondition of the techniques of the patent documents 4 and 5 is a system in which decoders are centrally controlled by a single processor core. The documents do not mention the case of applying the techniques to a multicore system in which decoders are controlled by different OSs.

An object of the present invention is to easily realize synchronization of processor cores in a multicore system.

The above and other objects and novel features of the present invention will become apparent from the description of the specification and the appended drawings.

Outline of representative one of inventions disclosed in the application will be briefly described as follows.

A data processing system receiving a group of data of different kinds from the outside and performing data processes by kinds includes: a plurality of data process control units corresponding to the kinds of the data group and performing data processes on the data group of corresponding kinds; and a memory unit which can be accessed by the data process control units and has a first region storing a value indicating whether the data process by the data process control units can be executed or not. Each of the data process control units updates the value in the first region on completion of preparation for executing the data process of itself and, when the value in the first region becomes a predetermined value, synchronizes start timings of the data processes and executes the data processes.

An effect obtained by the representative one of the inventions disclosed in the application will be briefly described as follows.

The data processing system can easily realize synchronization of processor cores in a multicore system.

BRIEF DESCRIPTION OF THE DRAWINGS

FIGS. 7A and 7B are explanatory diagrams showing a concrete example of an output timing adjusting method by a video decoder 142.

FIG. 10 is an explanatory diagram showing the case where a reproduction start position of moving image content is designated.

FIGS. 11A to 11C are explanatory diagrams showing an example of a method of adjusting timings of outputting audio stream data in the case of performing reproduction in the middle.

DETAILED DESCRIPTION

1. Outline of Embodiments

Figure 1:
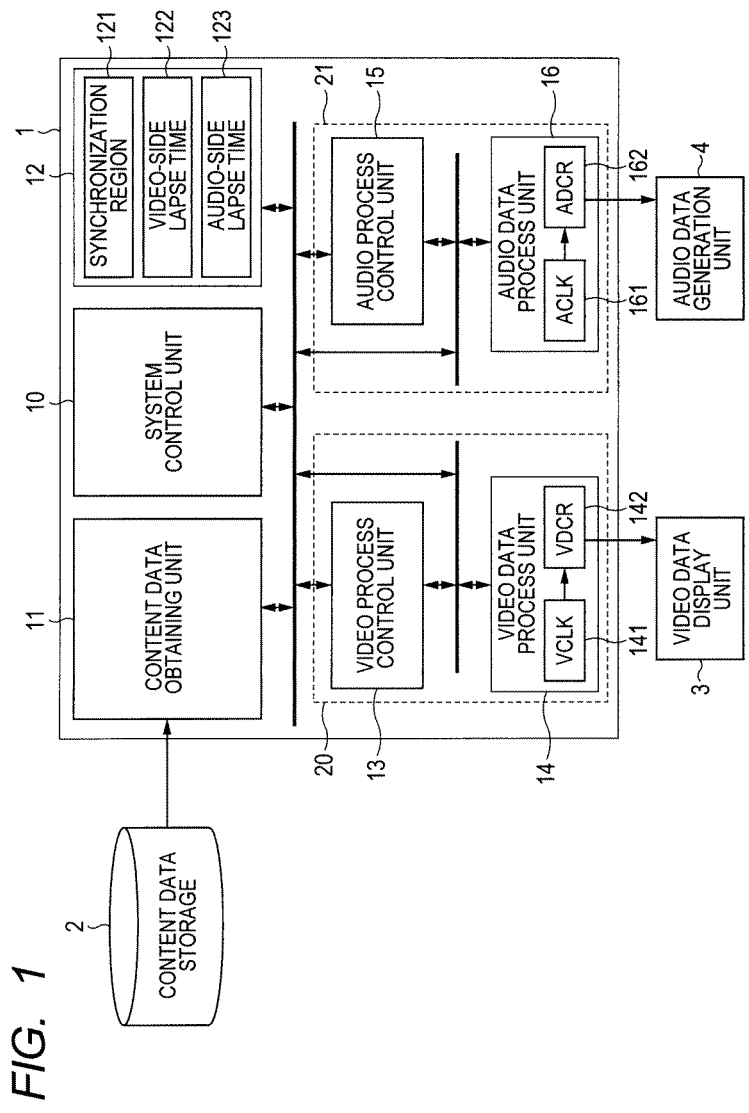
FIG. 1 is a block diagram of a multiprocessor system having a plurality of processor cores, according to a first embodiment.

First, outline of representative embodiments of the invention disclosed in the present application will be described. Reference numerals in the drawings referred to in parentheses in the description of the outline of the representative embodiments just illustrate the concept of components to which the reference numerals are designated.

[1] (Data Processing System Synchronizing Process Start Timings Using Common Memory)

A data processing system (1) as a representative embodiment of the invention is a data processing system for receiving a group of data of different kinds from the outside and performing data processes by kinds. The data processing system includes: a plurality of data process control units (20 and 21) corresponding to the kinds of the group of data and performing the data processes on the group of data of corresponding kinds; and a memory unit (12) which can be accessed by each of the data process control units and has a first region (121) storing a value indicating whether the data process can be executed or not. Each of the data process control units updates the value in the first region on completion of preparation for executing the data process of itself and, when the value in the first region becomes a predetermined value (zero), synchronizes timings of the data processes and executes the data process.

In the system, each of the data process control units waits until the value in the first region becomes the predetermined value and starts the data process, so that the start timings of the data processes of the data process control units can be synchronized. Since each of the data process control units determines whether the data process can be executed or not with reference to the value in the first region, it is unnecessary to preliminarily determine the master-servant relationship among the plurality of data process control units.

[2] (Concrete Configuration of Data Processing System)

In the data processing system of [1], the group of data is data in a plurality of continuous units of the data processes, data in the process unit includes content data to be processed and time information (PTS) instructing a timing of outputting a process result of the content data. The data process control unit includes: a reference time generator (141, 161) generating reference time expressing lapse time since start of the data process on the basis of an operation reference clock supplied to itself; a data processor (142, 162) executing the data process of data in the process unit and, referring to the reference time, outputting a process result at a timing based on the time information; and a controller (13, 15) updating a value in the first region and controlling operations of the reference time generator and the data processor. On confirmation that the value in the first region becomes the predetermined value (zero), the controller starts generating the reference time and starts the data process.

In the data processing system of [2], each of the data process control units executes the data process of data in the process unit and outputs the process result at a predetermined timing with reference to the reference time. Consequently, in the case where, for example, the data process control units use the common operation reference clock, the reference times each expressing lapse time since start of the data process become equal among the data process control units. Therefore, only by synchronizing the start timings of the data processes as described above, the process results of the data process control units are output in accordance with the common reference time. In the following processes, it is unnecessary to perform a new process for synchronization.

[3] Deviation Adjusting Method

In the data processing system of [2], the operation reference clocks which are different from one another are supplied to the data process control units. The controller calculates a deviation amount indicative of a deviation between lapse time of an operation measured on the basis of the operation reference clock supplied to the data process control unit including the controller and lapse time of an operation measured on the basis of the operation reference clock supplied to another data process control unit and, in the case where the deviation amount exceeds a predetermined amount, adjusts a timing of outputting a result of a process performed by the data process control unit including the controller on the basis of the deviation amount so as to decrease the deviation of output timings of the process results between the data process control units.

As described above, in the case where the data process control units use a common operation reference clock, the reference times in the data process control units are equal. However, in the case where the operation reference clocks are different from each other, there is the possibility that the reference time varies among the data process control units. When the reference time varies, even if the start timings of the data processes are synchronized, since the reference time to be referred to varies among the data process control units, the output timings of the process results are deviated. In the data processing system of [3], each of the data process control units grasps a deviation amount of the reference times among the data process control units on the basis of lapse time of the operation and, on the basis of the deviation amount, adjusts the output timing of the process result. Consequently, even when the reference time varies, a deviation in the output timings of the process results among the data process control units can be reduced.

[4] (Concrete Example of Deviation Adjusting Method: Adjustment of Output Timings)

In the data processing system of [3], the output timings are adjusted by calculating adjustment time according to the deviation amount and controlling the data processor so as to output a process result at time deviated from a timing indicated by the time information only by the adjustment time.

Since the output timing of one of the process results is adjusted in accordance with the adjustment time according to the deviation amount, the deviation in the output timings among the data process control units can be easily reduced.

[5] (Concrete Example of Deviation Adjusting Method: Adjustment of Decode Start Timing)

In the data processing system of [3], the output timings are adjusted by calculating adjustment time according to the deviation amount and controlling the data processor so as to deviate a timing of starting the data process in accordance with the adjustment time.

For example, in the case where time since start of a data process till the end in the data processor is almost constant, by adjusting the start timing of the data process, an output timing can be adjusted. Therefore, a deviation in the output timings can be easily reduced.

[6] (Concrete Configuration for Deviation Adjustment)

In the data processing system of any of [3] to [5], the group of data of different kinds includes video data and audio data of a moving image in a coded stream form. Data in the process unit in the video data and the audio data is one piece of frame data. The plurality of data process control units are a first data process control unit (20 or 21) performing a process of decoding the coded video data and outputting a process result and a second data process control unit (21 or 20) performing a process of decoding the coded audio data and outputting a process result. Each of the first and second data process control units has the controller (13 or 15), the data processor (142 or 162), and the reference time generator (141 or 161). The memory unit further has a second region (122 or 123) storing lapse time of an operation measured on the basis of the operation reference clock supplied to the first data process control unit by the first data process control unit, and a third region (123 or 122) storing lapse time of an operation measured on the basis of the operation reference clock supplied to the second data process control unit by the second data process control unit. The controller in the first data process control unit calculates the deviation amount by referring to the second and third regions and adjusts the output timings.

As described above, by providing the second and third regions in the memory unit and writing the lapse time of the operation in the regions by the first and second data process control units, the lapse time of the other side can be easily grasped. Paying attention to the fact that a human being is generally sensitive to a change in sound more than a change in a video image, in the data processing system of [6], the first data process control unit performing the video data process performs adjustment of the timings. Thus, without making a viewer recognize that the output timing of video data is changed, a deviation in output timings among the data process control units can be reduced.

[7] (Information of Lapse Time: Least Communication Multiple)

In the data processing system of [6], information of lapse time stored in the second and third regions is a value counted every time which is based on least common multiple of time of one cycle of the operation reference clock of the first data process control unit and time of one cycle of the operation reference clock of the second data process control unit.

For example, even in the case where the frequencies of the operation reference clocks are different, by counting the lapse time every time based on the least common multiple, the lapse time can be determined on the time axis common to the first and second data process control units, and deviation time can be easily grasped.

[8] (Calculation of the Deviation Amount at Predetermined Time Intervals)

In the data processing system of any of [3] to [7], the controller adjusts the output timing at predetermined time intervals.

For example, since a change in a video image which can be perceived by a human being is about 200 ms, if a deviation time is smaller than that, the possibility that a viewer cannot recognize a deviation between sound and a video image of a moving image is high. For example, by calculating the deviation amount at time interval at which a human being cannot recognize, without recognition of a deviation in a moving image of the viewer, the process load related to the timing adjustment can be reduced, and it contributes to reduction in power consumption of the entire system.

[9] Reproduction of Content from Designated Position

In the data processing system of any of [6] to [8], when reproduction start time (200) of the moving image is designated, the data processor in one of the first and second data process control units selects frame data (205) having the time information according to the designated time, starts decoding process sequentially from the selected frame data, and outputs a process result to an external reproducing apparatus. The data processor of the other data process control unit selects frame data (206) having the time information according to the designated time, when the time information of the selected frame data and that of the frame data selected by the one of data processors coincide with each other, starts the decoding process sequentially from the selected frame data, and outputs a process result to an external reproducing apparatus and, when the time information of the selected frame data and that of the frame data selected by the one of the data processors do not coincide with each other, controls reproduction of the selected frame data so as to be in a timing of outputting frame data selected by the one of the data processors.

In the case of starting reproduction from designated reproduction time, not reproduction of a moving image from the beginning (hereinbelow, called "reproduction in the middle"), reproduction is started using frame data having the time information matching the designated reproduction time as the head frame data. However, when there is no frame data having the matched time information, the frame data cannot be reproduced from some midpoint of the frame data, so that reproduction starts from the head of frame data having the time information corresponding to designated reproduction time. That is, by deviating the designated reproduction time to the time of the head of frame data, reproduction from the middle is realized. In this case, when the time information of the head frame data in reproduction from the middle in a video image and that in sound are different from each other, frame data is output at a timing designated by the time information of the head frame data in either a video image or sound. For the other head frame data, the timing is timing during frame data, and the frame data cannot be reproduced. In the data processing system of [9], by controlling reproduction on frame data to which the timing that is not the head of frame data out of head frame data of a video image and head frame data of sound on start of reproduction is designated, a moving image can be reproduced from designated reproduction time.

[10] (Concrete Example of Reproduction Control of Frame Data: Adjustment of Reproduction Time of Other Frame Data)

In the data processing system of [9], the other data processor (162) controls reproduction of the frame data by changing reproduction time of the selected frame data (206), thereby controlling reproduction of the frame data.

In the data processing system of [10], reproduction time of the other head frame data is adjusted so as to be in the output timing of one of the head frame data. Even in the case of reproduction from the middle, a video image and sound can be output at the same timing.

[11] (Concrete Example of Reproduction Control of Frame Data: Output of Silence Data)

In the data processing system of [9], the one of the data processors is the data processor (142) in the first data process control unit, and the other data processor is the data processor (162) in the second data process control unit. The data processor in the second data process control unit controls reproduction of the frame data by outputting frame data (208) indicative of a silence state in place of the selected audio frame data (206).

By inserting frame data in a silence state so as to match the output timing of frame data of a video image, reproduction of a moving image from designated reproduction time can be easily realized.

[12] (Example of Concrete Using Method of Common Memory)

In the data processing system in any of [2] to [11], a count value ("2") according to the number of the plurality of data process control units is set as an initial value of the value indicating whether the data process can be executed or not and, on completion of preparation of execution of the data process performed by the data processor, the controller performs the updating by decrementing the count value. The predetermined value is a count value indicative of zero.

With the configuration, the system in which start timings of the data processes in the data process control units are synchronized can be easily realized.

[13] (Incrementation of Common Memory at the Time of Stop)

In the data processing system in any of [3] to [12], in the case of stopping execution of the data process by the data processor, the controller updates the count value by incrementing it from the predetermined value.

For example, in the case where input of stream data of the one of the data process control units is disrupted, execution of the data process by the other data process control unit can be stopped. Therefore, output of only the process result of the other data process control unit can be prevented, and synchronizing operation of the data process controls can be maintained

[14] (Data Processing System in which Process Starts are Synchronized by Using Plural Common Memories)

A data processing system (5) according to another representative embodiment of the invention is a data processing system receiving a group of data of different kinds from the outside and performing data processes by kinds. The data processing system has: a plurality of data process control units (20, 21) corresponding to the kinds of the group of data and performing data processes on the group of data of corresponding kinds; and a memory unit (52) which can be accessed by each of the data process control units and has, for each of the data process control units, a first region (501, 502) storing a value indicating whether the data process can be executed or not. Each of the data process control units updates the value in the first region for itself on completion of preparation for executing the data process of itself, refers to a value in the first region corresponding to the other data process control unit and, when the values in the first regions become a predetermined value (zero), synchronizes start timings of the data processes, and executes the data process.

In the system, in a manner similar to [1], each of the data process control units waits until the value in the first region becomes the predetermined value and starts the data process, so that the start timings of the data processes of the data process control units can be synchronized. Since each of the data process control units determines whether the data process can be executed or not with reference to the value in the first region, it is unnecessary to preliminarily determine the master-servant relationship among the plurality of data process control units.

[15] (Concrete Configuration of Data Processing System)

In the data processing system of [14], the group of data is data in a plurality of continuous units of the data processes, data in the process unit includes content data to be processed and time information (PTS) instructing a timing of outputting a process result of the content data. The data process control unit includes: a reference time generator (141, 161) generating reference time expressing lapse time since start of the data process on the basis of an operation reference clock supplied to itself; a data processor (142, 162) executing the data process of data in the process unit and, referring to the reference time, outputting a process result at a timing based on the time information; and a controller (13, 15) updating a value in the first region and controlling operations of the reference time generator and the data processor. On confirmation that the value in the first region becomes the predetermined value, the controller starts generating the reference time and starts the data process.

In the case where, for example, the data process control units use the common operation reference clock, like in [2], only by synchronizing the start timings of the data processes, process results of the data process control units are output in accordance with the common reference time. Therefore, it is unnecessary to perform a new process for synchronization in the following processes.

[16] (Deviation Adjusting Method)

In the data processing system of [15], the operation reference clocks which are different from one another are supplied to the data process control units. The controller calculates a deviation amount indicative of a deviation between lapse time of an operation measured on the basis of the operation reference clock supplied to the data process control unit including the controller and lapse time of an operation measured on the basis of the operation reference clock supplied to the other data process control unit and, in the case where the deviation amount exceeds a predetermined amount, adjusts a timing of outputting a result of a process performed by the data process control unit including the controller on the basis of the deviation amount so as to decrease the deviation of output timings of the process results between the data process control units.

In a manner similar to the system of [3], even in the case where the reference time is deviated, a deviation in output timings of process results among the data process control units can be reduced.

[17] (Concrete Example of Deviation Adjusting Method: Adjustment of Output Timings)

In the data processing system, the output timings are adjusted by calculating adjustment time according to the deviation amount and controlling the data processor so as to output a process result at time deviated from a timing indicated by the time information only by the adjustment time.

In a manner similar to the system of [4], a deviation in output timings among the data process control units can be easily reduced.

[18] (Concrete Configuration for Deviation Adjustment)

In the data processing system of [16] or [17], the group of data of different kinds includes video data and audio data of a moving image in a coded stream form. Data in the process unit in the video data and the audio data is one piece of frame data, the plurality of data process control units are a first data process control unit (20) performing a process of decoding the coded video data and outputting a process result and a second data process control unit (21) performing a process of decoding the coded audio data and outputting a process result. Each of the first and second data process control units has the controller (13, 15), the data processor (142, 162), and the reference time generator (141, 161). The memory unit further has a second region (122) storing lapse time of an operation measured on the basis of the operation reference clock supplied to the first data process control unit by the first data process control unit, and a third region (123) storing lapse time of an operation measured on the basis of the operation reference clock supplied to the second data process control unit by the second data process control unit. The controller in the first data process control unit calculates the deviation amount by referring to the second and third regions and adjusts the timings.

Consequently, in a manner similar to [6], each of the first and second data process control units can easily grasp the lapse time on the other side, and a deviation in output timings between the data process control units can be reduced without recognition of a viewer that the output timing of video data is changed.

[19] (Deadlock Avoiding Method 1)

In the data processing system in any of [14] to [18], each of the data process control units updates a value of the first region of itself and, after that, refers to a value of the first region corresponding to the other data process control unit.

With the technique, a deadlock state such that data process cannot be started regardless of the fact that preparation for data process is completed in the data process control units can be avoided.

[20] (Deadlock Avoiding Method 2)

In the data processing system in any of [14] to [19], each of the data process control units refers to a value of the first region corresponding to the other data process control unit and, after lapse of predetermined time, updates a value of the first region of itself.

With the technique, a deadlock state such that data process cannot be started regardless of the fact that preparation for data process is completed in the data process control units can be avoided.

[21] (Semiconductor Device of First Embodiment)

The data processing system in any of [1] to [13] has a single-chip or multi-chip configuration.

The configuration contributes to reduction in the area of the entire system.

[22] (Semiconductor Device of Second Embodiment)

The data processing system in any of [14] to [20] has a single-chip or multi-chip configuration.

The configuration contributes to reduction in the area of the entire system.

2. Details of the Embodiments

Embodiments will be described more specifically.

First Embodiment

FIG. 1 is a block diagram of a multiprocessor system having a plurality of processor cores, as an embodiment of a data processing system according to the present invention. A multiprocessor system 1 shown in the diagram is, although not limited, formed on a single semiconductor substrate made of single-crystal silicon by a known CMOS integrated circuit manufacturing technique. The multiprocessor system 1 is, for example, a system LSI for reproducing moving image content for a cellular phone or a car navigation.

Data of moving image content is, for example, stream data coded according to the MPEG (Moving Picture Expert Group) standard and is obtained by multiplexing video stream data and audio stream data. Reproduction time per frame unit of the video stream data and that of the audio stream data are different from each other. For example, in the case of video content of 29.97 frames per second, reproduction time of the video stream data of one frame is about 33 ms. On the other hand, reproduction time of the audio stream data is according to the frequency (for example, 22 kHz, 44.1 kHz, 48 kHz, 192 kHz, or the like) used at the time of coding at a sampling rate.

The data of moving image content is temporarily stored from a communication network or the like into a content data storage 2 and, after that, is supplied to the multiprocessor system 1. The multiprocessor system 1 splits the input moving image content data into audio stream data and video stream data and executes decoding process on each of the audio stream data and the video stream data. By outputting the decoded video data to a video data display unit 3 to reproduce a video image and outputting the decoded audio data to an audio data generation unit 4 to reproduce sound, reproduction of the moving image content is realized.

The multiprocessor system 1 can be roughly divided into a video processing system 20 mainly performing the video data decoding process, an audio processing system 21 mainly performing the audio data decoding process, and a control system controlling the entire system. Each of the video processing system 20 and the audio processing system 21 includes a CPU core and a computation block. In the CPU cores, different application programs are executed by OSs. Specifically, in one of the plurality of CPU cores in the multiprocessor system 1, a program for processing video data is executed under control of a first OS, thereby controlling the video processing system 20 and, in the other CPU core, a program for processing audio data is executed under control of a second OS, thereby controlling the audio processing system 21. Different operation reference clocks are supplied to the video processing system 20 and the audio processing system 21, and the data process is executed on the basis of the operation reference clocks. Each of the operation reference clocks is, for example, a clock signal generated on the basis of a clock signal from a crystal oscillator coupled to the outside, an external clock signal supplied from the outside, or the like, by an unshown PLL (Phase Locked Loop).

The control system is configured by a system control unit 10 and a content data obtaining unit 11. The system control unit 10 is a function unit performing overall control on the entire system and is realized by, for example, a program process by a CPU core. The content data obtaining unit 11 obtains content data of a moving image stored in the content data storage 2 in response to an instruction from the system control unit 10. The system control unit 10 splits the obtained content data into video stream data and audio stream data and supplies the video stream data and the audio stream data to the video processing system 20 and the audio processing system 21, respectively. The control system may be realized by execution of a system control program under control of the first or second OS or by newly preparing a CPU core and realized under control of a third OS executed by the CPU core.

The video processing system 20 is configured by a video process control unit 13 and a video data process unit 14. The video process control unit 13 is a function unit performing overall control on the video data process and is realized by a program process executed by the CPU core. The video data process unit 14 is a function unit performing process on the coded video stream data and is configured by, for example, a dedicated logic circuit. Concretely, the video data process unit 14 is configured by a video hardware clock (VCLK) 141 and a video decoder (VDCR) 142. The video hardware clock 141 generates reference time expressing lapse time since start of data process performed by the video decoder 142 on the basis of the operation reference clock supplied to the video processing system 20. The video decoder 142 receives the coded video stream data supplied via the system control unit 10, executes decoding process on the data, and outputs the video data subjected to the decoding process on the basis of the reference time to the video data display unit 3. The video data display unit 3 is a video reproducing apparatus and is, for example, an LCD. The details of the processes in the video processing system 20 will be described later.

The audio processing system 21 is configured by an audio process control unit 15 and an audio data process unit 16. The audio process control unit 15 is a function unit performing overall control on the audio data process and is realized by, for example, a program process executed by a CPU core which is different from the CPU core in the video processing system 20. The audio data process unit 16 is a function unit performing process on the coded audio stream data and is configured by, for example, a dedicated logic circuit. Concretely, the audio data process unit 16 is configured by an audio hardware clock (ACLK) 161 and an audio decoder (ADCR) 162. The audio hardware clock 161 generates reference time expressing lapse time since start of data process performed by the audio decoder 162 on the basis of the operation reference clock supplied to the audio processing system 21. The audio decoder 162 receives the coded audio stream data supplied via the system control unit 10, executes decoding process on the data, and outputs the audio data subjected to the decoding process on the basis of the reference time to the audio data generation unit 4. The audio data generation unit 4 is an audio reproducing apparatus and is, for example, a speaker. The details of the processes in the audio processing system 21 will be described later.

The multiprocessor system 1 also has a memory unit 12 including a ROM (Read Only Memory) and a RAM (Random Access Memory) storing software for the program processes by the CPU cores. The RAM has memory regions as common memories which can be accessed by both of the CPU core of the video processing system and the CPU core of the audio processing system 21. Concretely, as the memory regions serving as the common memories, a synchronization region 121, a video-side lapse time region 122, and an audio-side lapse time region 123 are provided. The details of each of the regions will be described later.

Concrete data processes performed by the video processing system 20 and the audio processing system 21 will be described.

Figure 2:
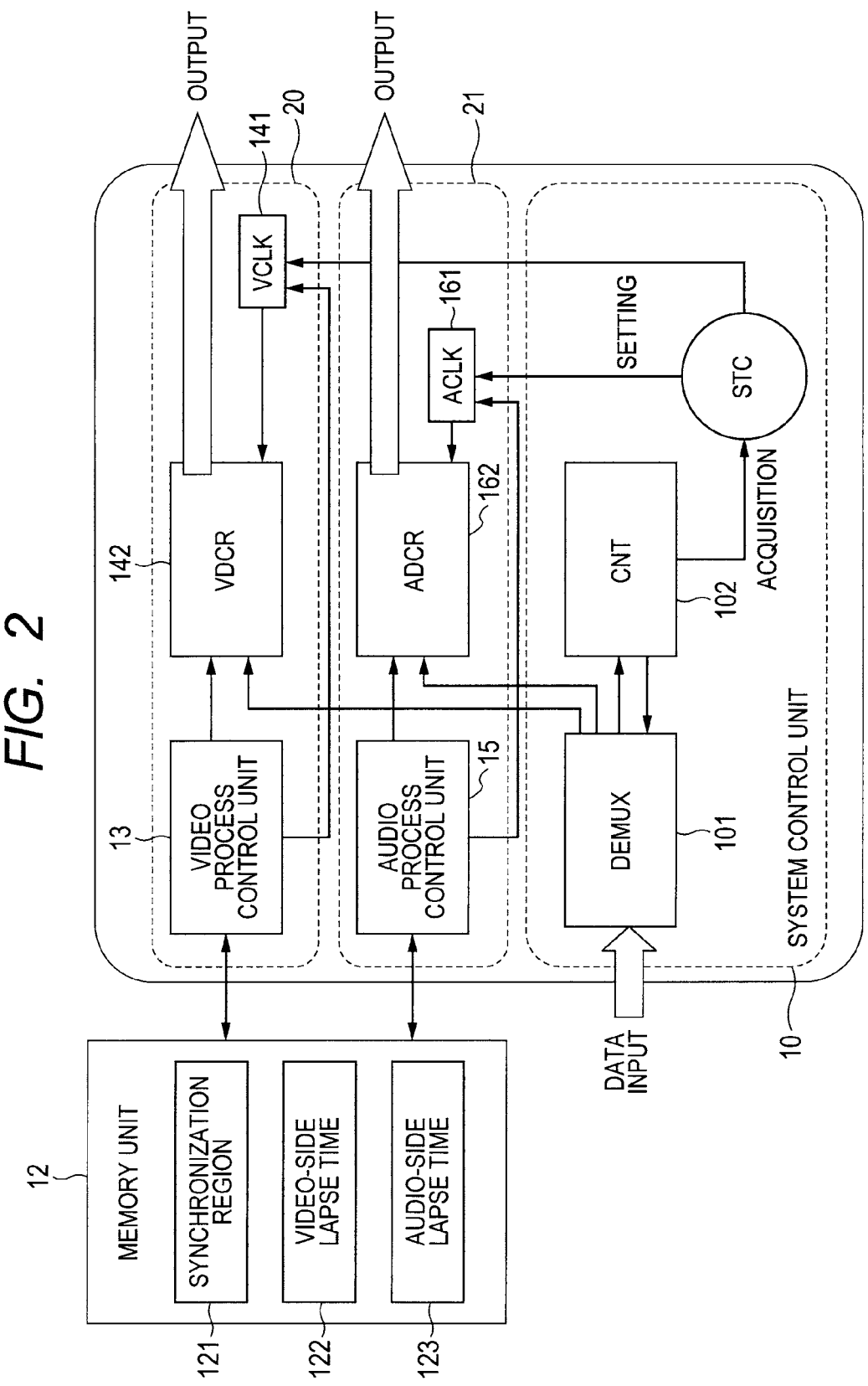
FIG. 2 is an explanatory diagram showing an example of process of decoding video stream data and sound stream data by a multiprocessor system 1.

FIG. 2 is an explanatory diagram showing an example of a concrete configuration of the video processing system 20 and the audio processing system 21.

First, the system control unit 10 receives multiplexed stream data from the content data obtaining unit 11. The system control unit 10 includes, for example, a demultiplexer (DEMUX) 101 and a controller (CNT) 102. The demultiplexer 101 and the controller 102 are a function part realized by, for example, a CPU core executing a program process. According to an instruction from the controller 102, the demultiplexer 101 splits audio stream data and video stream data from the stream data supplied to the system control unit 10, supplies the audio stream data to the audio decoder 162, and supplies the video stream data to the video decoder 142. The controller 102 performs overall control on the process of decoding the video data and the audio data. Concretely, the controller 102 gives an operation instruction to execute/stop the decoding process to the demultiplexer 101 and instructs the video process control unit 13 and the audio process control unit 15. In the case where information of a time reference value such as PCR (Program Clock Reference) or SCR (System Clock Reference) is included in the multiplexed stream data, on the basis of the value of PCR or SCR extracted from the multiplexed stream data by the demultiplexer 101, the controller 102 sets or calibrates the value of STC (System Time Clock) to a value intended at the time of coding. The value of STC is time information for reproducing reference time at the time of coding. On the basis of the value of STC, the controller 102 sets an initial value or the like of the reference time for each of the audio hardware clock 161 and the video hardware clock 141.

When execution of the decoding process is instructed, the video process control unit 13 and the audio process control unit 15 control the decoders 142 and 162 and the hardware clocks 141 and 161 to start the decoding process. Concretely, in response to an operation start instruction from the video process control unit 13, the video decoder 142 starts the process of decoding video stream data, and the video hardware clock 141 starts generating the reference time related to the video stream data decoding process. Similarly, in response to an operation start instruction from the audio process control unit 15, the audio data process unit 162 starts the process of decoding audio stream data, and the audio hardware clock 161 starts generating the reference time related to the audio stream data decoding process.

In the video stream data and the audio stream data, in addition to real data of video and audio content, time information instructing a timing of performing decoding reproduction (hereinbelow, also called as a "time stamp") is included in each frame. The time stamps are, for example, PTS (Presentation Time Stamp) as time management information of a reproduction output and DTS (Decoding Time Stamp) as time management information of decoding. Referring to the reference time generated by the video hardware clock 141, the video decoder 142 outputs the decoded video stream data frame by frame at timings indicated by the PTS. For example, the video decoder 142 refers to the reference time and, at the time indicated by the PTS, outputs a result of the process of decoding a corresponding frame. The audio decoder 162 performs similar operations on the basis of the time stamps included the audio stream. In such a manner, the video decoder 142 and the audio decoder 162 sequentially output the decoding process result frame by frame at timings indicated by the time stamps, thereby realizing reproduction of moving image content.

However, in the case where the audio and video decoding processes are executed under control of different processor cores as described above, without awareness of synchronization of the audio and video decoding processes, a deviation may occur between the timing of sound reproduced and the timing of a video image displayed. In the multiprocessor system 1 of the embodiment, by using the common memory, the start timing of the audio data decoding process and that of the video data decoding process are synchronized.

Figure 3:
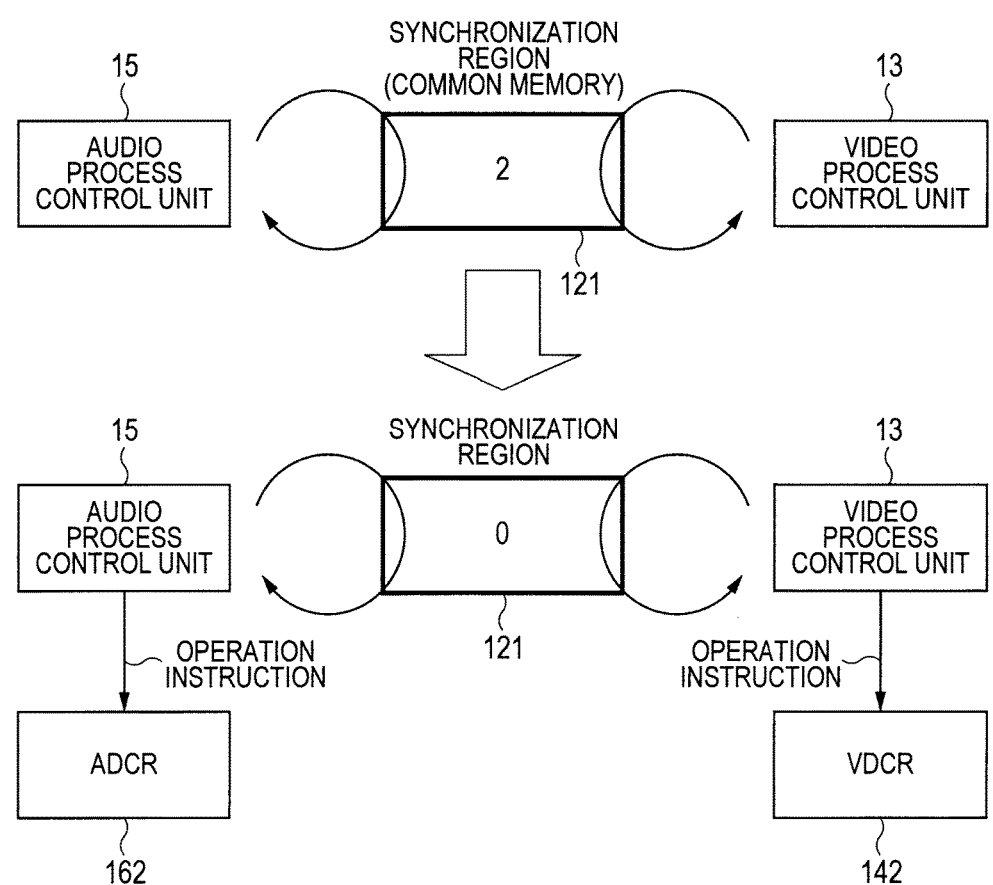
FIG. 3 is an explanatory diagram showing an example of a method of adjusting start timings of two decoding processes.

FIG. 3 is an explanatory diagram showing an example of a method of adjusting start timings of two decoding processes. As shown in the diagram, an initial value is set in advance in the synchronization region 121 in the memory unit 12. As the initial value, for example, the number of CPU cores necessary to synchronize the start timings, that is, a value according to the number of data processes necessary to synchronize the start timings is set. In the embodiment, the start timings of two processes, the audio data decoding process and the video data decoding process, have to be synchronized, so that "2" is set as the initial value as illustrated in FIG. 3.

The video process control unit 13 and the audio process control unit 15 periodically access the synchronization region 121 and recognize the value. After completion of preparation of start of the decoding process of itself, the video process control unit 13 or the audio process control unit 15 accesses the synchronization region 121 in the memory unit 10 and updates the held value. For example, after completion of preparation of the video stream data decoding process, the video process control unit 13 decrements the value in the synchronization region 121 to "1". The video process control unit 13 waits until the value in the synchronization region 121 becomes "0 (zero)". The waiting is realized by, for example, a busy loop or polling at predetermined time intervals. The predetermined time interval is, for example, a time interval to a degree that the viewer cannot recognize the deviation between sound and a video image. After completion of preparation of the audio stream data decoding process, the audio process control unit 15 decrements the value in the synchronization region 121 to "0". When the value becomes "0", the video process control unit 13 instructs the video decoder 142 and the video hardware clock 141 to start operating, and the audio process control unit 15 instructs the audio decoder 162 and the audio hardware clock 161 to start operating. In such a manner, the start timing of the audio data decoding process and that of the video data decoding process can be synchronized.

Also during execution of the decoding process, the audio process control unit 15 and the video process control unit 13 periodically access the synchronization region 121 and recognize the value in the synchronization region 121. In the case where the process cannot be continued for any cause during execution of the decoding process, the video process control unit 13 and the audio process control unit 15 increment the value of the synchronization region 121. For example, in the case where moving image content is provided via a network, provision of either the audio stream data or the video stream data may be interrupted due to the influence of the communication environment or the like. In such a case, the video process control unit 13 or the audio process control unit 15 to which stream data provision is interrupted increments the value of the synchronization region 121, thereby interrupting both of the decoding processes.

Figure 4:
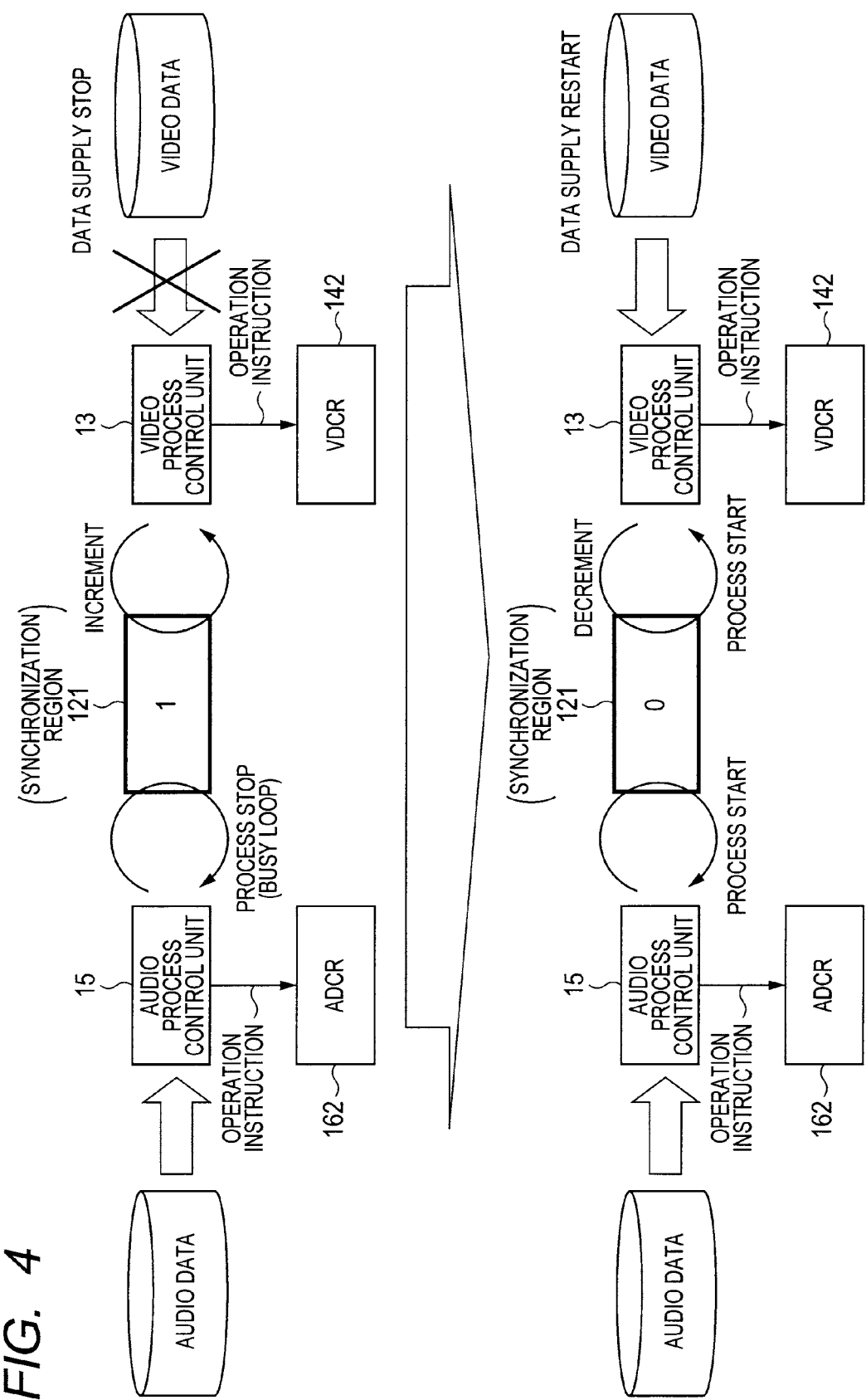
FIG. 4 is an explanatory diagram showing an example of a method of interrupting the decoding process.

FIG. 4 is an explanatory diagram showing an example of a method of interrupting the decoding process. As shown in the diagram, for example, in the case where some failure occurs on the video process side and the decoding process cannot be continued, the video process control unit 13 increments the value of the synchronization region 121 to "1" and interrupts the decoding process. The audio process control unit 15 which recognizes that the value of the synchronization region 121 became "1" gives an operation stop instruction to the audio decoder 162 and the audio hardware clock 161 to interrupt the audio stream data decoding process. After that, when the video process side recovers and the decoding process can be restarted, the video process control unit 13 decrements the value of the synchronization region 121 to "0". Each of the audio process control unit 15 and the video process control unit 13 which recognize that the value of the synchronization region 121 became "0" restarts the decoding process. In such a manner, the timings of interruption of the decoding processes and those of restarting the decoding processes can be synchronized.

If the video processing system 20 and the audio processing system 21 use the common operation reference clock, by making the operation start timing of the video hardware clock 141 and that of the audio hardware clock 161 coincide with each other as described above, the reference times generated become equal to each other. When the reference times are equal, the audio decoding process result and the video decoding process result are output using the same time axis as a reference. Consequently, only the start timings of the decoding processes are synchronized, a video image and sound are reproduced without a deviation. However, in the case where the operation reference clocks are different from each other like in the embodiment, even if the operation start timing of the video hardware clock 141 and that of the audio hardware clock 161 are coincided, there is the possibility that the reference time of the video processing system 20 and that of the audio processing system 21 are deviated from each other. Even in the case of using the common operation reference clock, when various processes use timers (system clocks) measured and managed by their OSs, the process timings are rounded to the precision of the timers. Consequently, there is the possibility that an error occurs between the reference times. If there is a deviation between the reference time of the video processing system 20 and that of the audio processing system 21, even when the start timings of the decoding processes are made coincided, a deviation occurs between output timings of the decoding process results, and a video image and sound of a moving image are reproduced with a deviation. In the multiprocessor system 1, by performing adjustment of output timings of the decoding process results on the basis of a deviation amount of lapse times of the operations of the video processing system 20 and the audio processing system 21 in addition to adjustment of the start timings using the synchronization region 121, a deviation between a video image and sound in reproduction of a moving image is prevented.

Figure 5:
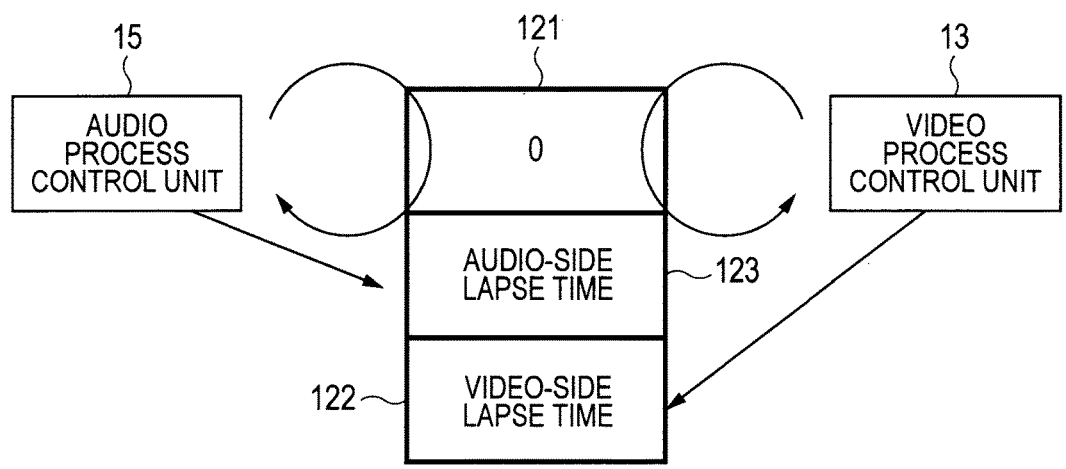
FIG. 5 is an explanatory diagram showing an example of a method of recording lapse time.

FIG. 5 is an explanatory diagram showing an example of a method of recording the lapse time.

As shown in the diagram, as the regions of the common memory in the memory unit 10, in addition to the synchronization region 121, the video-side lapse time region 122 for storing lapse time of the operation of the video processing system 20 and the audio-side lapse time region 123 for storing lapse time of the operation of the audio processing system 21 are provided. Only a corresponding system is allowed to rewrite data in the video-side lapse time region 122 and the audio-side lapse time region 123, and both of the processing systems are allowed to read data. Concretely, the video process control unit 13 stores lapse time of the operation of the video processing system 20 into the video-side lapse time region 122, and the audio process control unit 15 stores the lapse time of the operation of the video processing system 20 into the audio-side lapse time region 123. The control units monitor each other's lapse time. The lapse time of the operation is, for example, lapse time since start of the decoding process. For example, in the video processing system 20, the video process control unit 13 calculates the lapse time on the basis of the reference time output from the video hardware clock 141 and records the value in the video-side lapse time region 122. A counter counting lapse time since the operation start of the video processing system 20 on the basis of the operation reference clock supplied to the video processing system 20 is separately provided, and the video process control unit 13 records the value of the counter in the video-side lapse time region 122. In the audio processing system 21, operations are similar. Values to be recorded are, for example, time information in a second unit and a count value based on the least common multiple of the frequency of each of the operation reference clocks. For example, in the case where the operation reference clock of the video process system 20 is 8 MHz (cycle T=125 ns) and the operation reference clock of the audio processing system 21 is 10 MHz (cycle T=100 ns), the count value is incremented every time using 500 ns as the least common multiple of one cycle of each of the operation reference clocks and updated. Even in the case where the decoding process or output of the process result is interrupted in the middle, each of the control units responsibly updates the lapse time. By recording the lapse time using the common time axis, a deviation of time between the video processing system and the audio processing system can be easily grasped.

A method of adjusting the output timing of the decoding process result based on a deviation in the lapse times will be described concretely.

Adjustment of the output timing of the decoding process result is performed by either the video processing system 20 and the audio processing system 21. As described above, since a human being is, generally, sensitive to a change in sound more than a change in a video image, the case of adjusting the output timing in the video processing system 20 will be described as an example.

Figure 6:
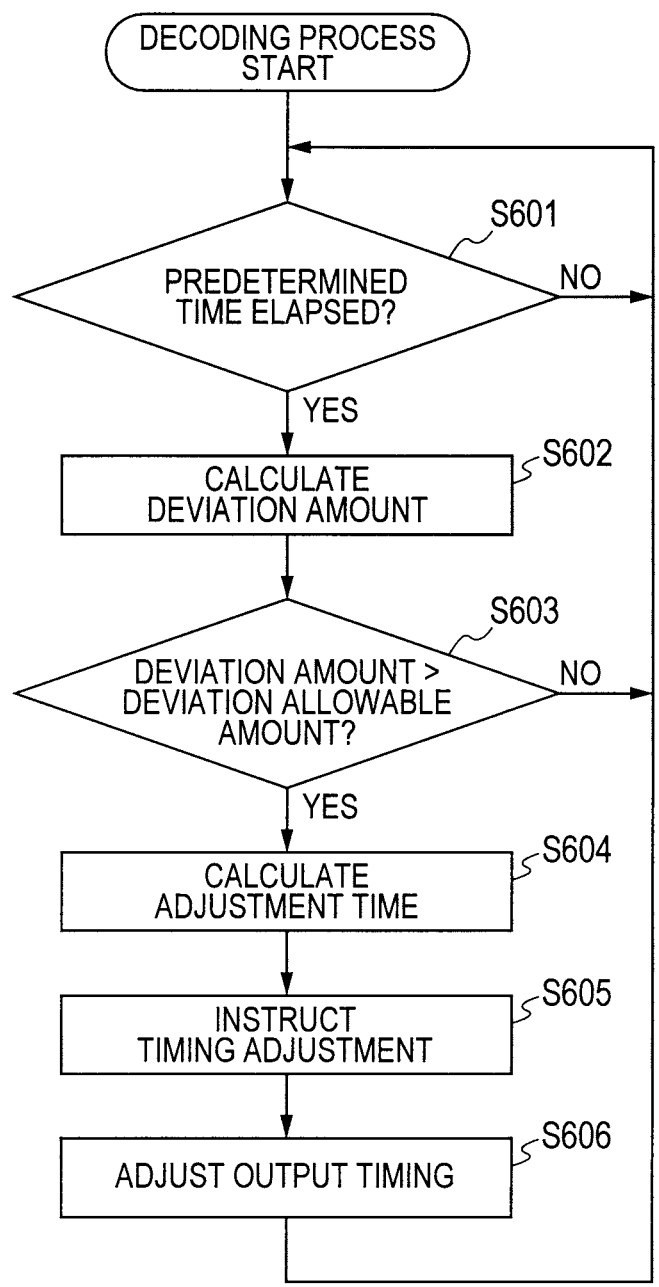
FIG. 6 is a flowchart showing an example of the flow of processes related to output timing adjustment.

FIG. 6 is a flowchart showing an example of the flow of processes related to output timing adjustment in the video process control unit 13. First, when the video stream data decoding process is started, the video process control unit 13 checks whether predetermined time has elapsed or not (S601). The predetermined time is shorter than time in which the viewer recognizes a deviation between moving images. For example, as described above, since a change in a video image which can be perceived by a human being is about 200 ms, if a deviation time is shorter than 200 ms, the possibility that a viewer cannot recognize a deviation between sound and a video image of a moving image is high. For example, in the case where the output interval between decoding process results of one frame is 33 ms, the video process control unit 13 refers to the memory unit 12 every 33 ms and calculates a deviation amount of the lapse times which will be described later.

In step 601, in the case where the predetermined time has not elapsed yet, the video process control unit 13 waits for lapse of the predetermined time. On the other hand, in the case where the predetermine time has elapsed, the video process control unit 13 refers to the video-side lapse time region 122 and the audio-side lapse time region 123 and calculates a deviation amount of the lapse times (S602). The deviation amount is calculated by computing the difference between the two lapse times. Subsequently, the video process control unit 13 compares a deviation allowable amount and the calculated deviation amount (S603). The deviation allowable amount is, for example, a value which is preset in a storage such as a register provided in the video process control unit 13. The value set as the deviation allowable amount is, for example, a value of time sufficiently shorter than time in which a viewer can recognize a deviation of moving images and is, for example, a value of 1 ms or less.

In the case where the deviation amount is smaller than the deviation allowable amount as a result of the comparison, the video process control unit 13 moves to step 601 and waits again for lapse of the predetermined time. On the other hand, in the case where the deviation amount is larger than the deviation allowable amount, the video process control unit 13 calculates adjustment time for adjusting the output timing on the basis of the deviation amount (S604). The adjustment time may be, for example, a value so that the deviation amount becomes smaller than the deviation allowable amount and does not have to be equal to the deviation amount of the lapse time. The video process control unit 13 instructs the video decoder 142 to adjust the output timing of the decoding process result of the video stream data and outputs information of the calculated adjustment time (S605). The video decoder 142 which receives the instruction adjusts the output timing on the basis of the information of the adjustment time (S606). After that, the video process control unit 13 moves to the step 601, and the above-described processes are repeated.

FIGS. 7A and 7B are explanatory diagrams showing a concrete example of an output timing adjusting method by the video decoder 142.

The adjusting method shown in FIG. 7A is a method of performing control so that a decoding process result is output at time deviated from a timing indicated by the time stamp (PTS) of the video stream data only by the adjustment time. According to the method, the output timing of the video stream data decoding process result is deviated by the adjustment time, so that the reproduction timing of a video image by the video data display unit 3 can be deviated. Consequently, a deviation between a video image and sound caused by the deviation in the output timing of the decoding result can be easily reduced.

The adjusting method shown in FIG. 7B is a method of performing control so that a decoding process is started at time deviated only by the adjustment time. For example, in the case where time since start of the data process in the video decoder 142 to completion is almost constant, by retarding or advancing the start timing of the decoding process of the video decoder 142, the output timing of the video stream data decoding process result can be deviated. That is, the reproduction timing of a video image by the video data display unit 3 can be deviated. Consequently, a deviation between a video image and sound caused by the deviation in the output timing of the decoding result can be easily reduced.

Which one of the two adjusting methods is employed depends on the system configuration of the video decoder 142. The case of applying the adjusting method shown in FIG. 7A as an example will be more specifically described using, concretely, two states shown in FIGS. 8A and 8B and FIGS. 9A and 9B as an example.

Figure 8A:
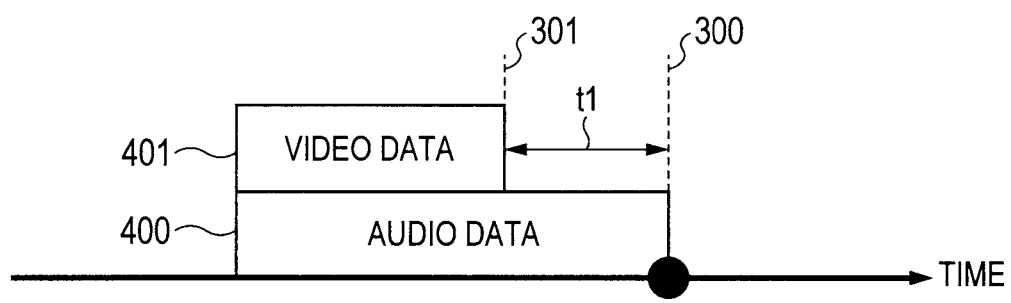
FIGS. 8A and 8B are explanatory diagrams showing a case where a video data decoding process is ahead of an audio data decoding process.
Figure 8B:
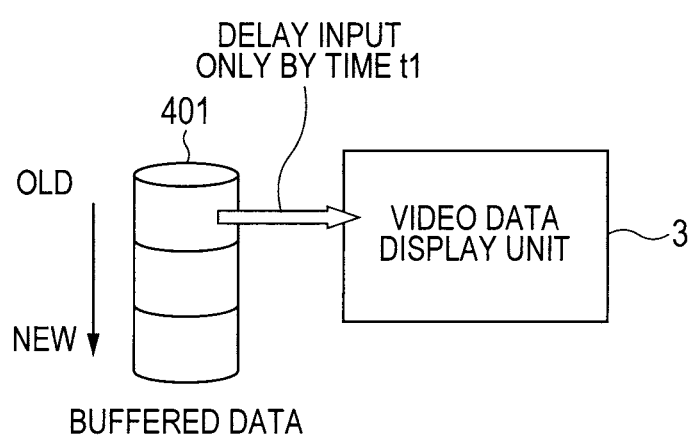

FIGS. 8A and 8B are explanatory diagrams showing a case where a video data decoding process is ahead of an audio data decoding process. In FIG. 8A, an audio data decoding process result 400 and a video data decoding process result 401 are data of one frame designated to be output at the same timing in the reference time. In the diagram, the reference time of the video stream data decoding process is ahead of that of the audio stream data decoding process, the output timing of the decoding process result 400 on the common time axis is the timing indicated by reference numeral 300, and the output timing of the decoding process result 401 is the timing indicated by reference numeral 301. As shown in the diagram, the reference time is deviated only by time t1, so that the video process control unit 13 outputs a decoding process result at a timing delayed only by the adjustment time t1. For example, as shown in FIG. 8B, at time delayed from the time designated by the time stamp only by the adjustment time t1, the decoding process result 401 is output to the video data display unit 3. As a result, a deviation between the output timing of the audio data decoding process result 400 and that of the video data decoding process result 401 can be reduced. Although the adjustment time is set to the same value as the deviation time t1, the invention is not limited to the case. The adjustment time may be determined to be deviation time in which a viewer does not recognize a deviation.

Figure 9A:
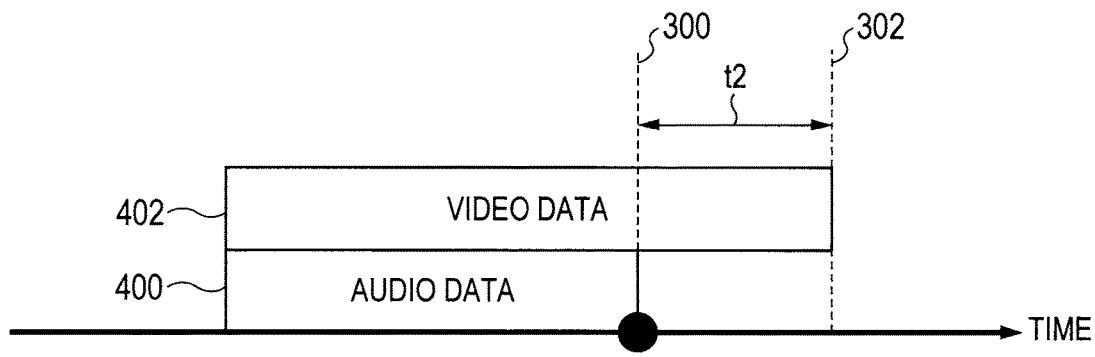
FIGS. 9A and 9B are explanatory diagrams showing a case where the video data decoding process is behind the audio data decoding process.
Figure 9B:
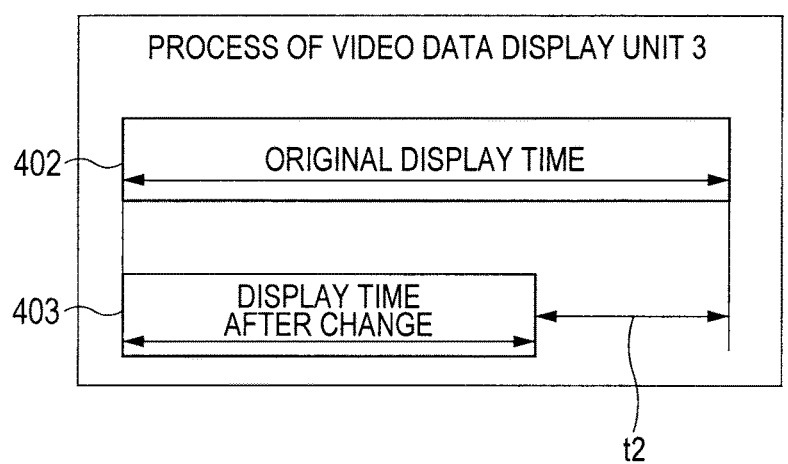

FIGS. 9A and 9B are explanatory diagrams showing a case where the video data decoding process is behind the audio data decoding process. In FIG. 9A, the audio data decoding process result 400 and a video data decoding process result 402 are data of one frame designated to be output at the same timing in the reference time. In the diagram, the reference time of the video stream data decoding process is behind the reference time of the audio stream data decoding process, the output timing of the decoding process result 400 on the common time axis is the timing indicated by reference numeral 300, and the output timing of the decoding process result 402 is the timing indicated by reference numeral 302. As shown in the diagram, the reference time is deviated only by time t2, so that the video process control unit 13 shortens the display time of the video data decoding process result 402 only by the adjustment time t2 and displays the video image on the video data display unit 3. For example, as shown in FIG. 9B, the video process control unit 13 instructs the video decoder 142 to shorten display time of the decoding process result 402 only by the adjustment time t2, and the video decoder 142 which receives the instruction changes the information of the display time included in the decoding process result 402, and outputs the information to the video data display unit 3 at the timing indicated by the time stamp (PTS) of the decoding process result 402. For example, in the case where the original display time of the decoding process result 402 of one frame is 33 ms and the deviation time t2 is 13 ms, the display time of the decoding process result 402 of one frame is set as 20 ms and is output to the video data display unit 3. Although the adjustment time is set to the same value as the deviation time t2, the invention is not limited to the adjustment time.

Since the output timing adjusting process is executed every predetermined time, not always executed during the decoding process, while preventing a deviation in the moving image reproduction which can be recognized by a viewer, the load of process related to the output timing adjustment can be reduced, and the invention contributes to lower power consumption of the entire system.

Next, a method of reproducing moving image content in the middle will be described.

FIG. 10 is an explanatory diagram showing the case where a reproduction start position of moving image content is designated.

As shown in the diagram, moving image content data is configured by audio stream data and video stream data having a data configuration which is continuous on the frame unit basis. In many cases, although the reproduction intervals of the audio stream data and the video stream data on the frame unit basis are different from each other, the audio stream data and the video stream data at the head of moving image content is coded at the same reproduction timing. Even in the case where the reproduction timing of the audio stream data and that of the video stream data at the head are deviated from each other, information of a deviation width of the reproduction timing is included in metadata or the like. Consequently, in the case of reproducing moving image content from the beginning, by synchronizing the start timing of the audio decoding process and that of the video decoding process, the moving image content can be reproduced without any problem. However, in the case of designating the reproduction position and reproducing a moving image by, for example, a special reproduction function of a multimedia reproducing device, if the designated position is in some midpoint of a frame, not at the head of a frame, the moving image cannot be reproduced from the designated position. Since information necessary for reproduction is stored in the head position of each frame, a moving image is reproduced only from the head of a frame. In the case where the reproduction start position is designated, the multiprocessor system 1 starts reproduction from a break position of a frame. For example, when the position indicated by reference numeral 200 is designated as the reproduction start position as shown in FIG. 10, reproduction is started from any of positions indicated by reference numerals 201 to 204. In this case, although it is not limited to select the break position 201 or 202 of the video stream data or the break position 203 or 204 of the audio stream data, the case of using the break position 201 or 202 of the video stream data as the reproduction start position will be described in the embodiment.

For example, in the case where the reproduction start position of moving image content is set to the position indicated by reference numeral 201, the video process control unit 13 selects a frame indicated by reference numeral 205 as the head frame of video stream data, and the video decoder 142 executes the decoding process sequentially from the frame 205 and outputs a process result. On the other hand, the audio process control unit 15 selects, for example, a frame indicated by reference numeral 206 close to the position 201 as the head frame of audio stream data. In the case where the head position (output timing) 203 of the frame 206 and the head position (output timing) 201 of the frame 205 coincide with each other, the video decoder 142 executes the decoding process sequentially from the frame 206 and outputs a process result. However, in the case where the head position 201 of the frame 206 and the head position 203 of the frame 205 do not coincide with each other as illustrated in FIG. 10, adjustment to make the output timing coincide with the output timing on the video side is necessary. The adjusting method in this case will be described in detail with reference to FIGS. 11A to 11C.

FIGS. 11A to 11C are explanatory diagrams showing an example of a method of adjusting output timings of audio stream data in the case of performing reproduction in the middle. For example, as shown in FIG. 11A, in the case where the head position of the video frame 205 is set to the reproduction start position 201, there is deviation time t0 between the head position of the video frame 205 and the head position of the audio frame 206, the timings of sound and an image are not synchronized at the time of start of reproduction. As a first adjusting method, as shown in FIG. 11B, reproduction time of the frame 206 is shortened only by the deviation time t0, and reproduction is performed. Concretely, in response to an instruction from the audio process control unit 15, the audio decoder 162 changes information of reproduction time included in the decoding process result of the frame 206 and outputs the resultant information to the audio data generation unit 4. As a result, also in the case of reproduction in the middle, the timings of sound and a video image are synchronized and reproduction can be started.

As a second adjusting method, as shown in FIG. 11C, a silence interval is set without reproducing the frame 206. Concretely, in response to an instruction from the audio process control unit 15, the audio decoder 162 generates a frame 208 indicative of a silence state having reproduction time obtained by shortening the reproduction time of the frame 206 only by the deviation time t0, and outputs the frame 208 in place of the decoding process result of the frame 206 to the audio data generation unit 4. Consequently, even in the case of reproduction in the middle, the timings of sound and a video image are synchronized and reproduction can be started.

The two adjusting methods can be also applied to the case of adjusting the head frame of a video image using the head position of an audio frame as the reproduction start position.

As described above, in the multiprocessor system 1 of the first embodiment, by performing adjustment of the decoding process start timing and adjustment of the output timing of the decoding process result, even in the case where the video processing system 20 and the audio processing system 21 are managed by different Oss in the multiprocessor system, without causing deterioration in a moving image, content can be reproduced. Since the video process control unit 13 and the audio process control unit 15 determine whether the decoding process can be executed or not by referring to the value in the synchronization region 121, it is unnecessary to preliminarily determine the master-servant relationship between the video processing system 20 and the audio processing system 21. Further, even in the case where the reproduction start position of moving image content is designated, by adjusting reproduction time or the like of the head frame of either an audio frame or a video frame corresponding to the designated reproduction start position, the timings of sound and a video image are synchronized and reproduction can be started.

Second Embodiment

Figure 12:
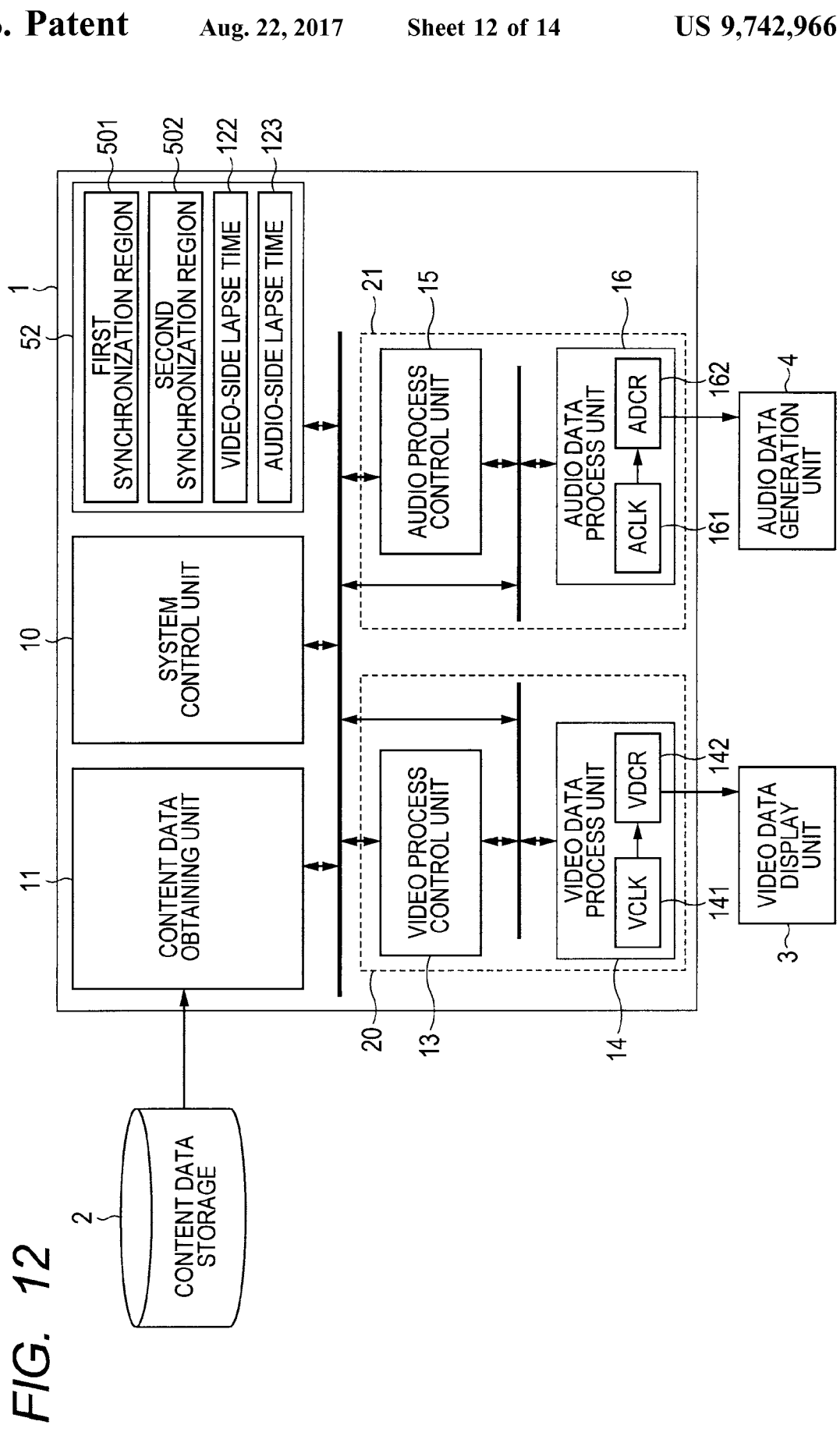
FIG. 12 is a block diagram showing a multiprocessor system having a plurality of processor cores, according to a second embodiment.

FIG. 12 is a block diagram showing a multiprocessor system having a plurality of processor cores, as another embodiment of the data processing system according to the present invention. A multiprocessor system 5 shown in the diagram is, although not limited, formed on a single semiconductor substrate made of single-crystal silicon by a known CMOS integrated circuit manufacturing technique. The multiprocessor system 5 is, for example, a system LSI for reproducing moving image content for a cellular phone or a car navigation. In the multiprocessor system 5, the same reference numerals are designated to components similar to those of the multiprocessor system 1 of the first embodiment, and their detailed description will not be repeated.

The multiprocessor system 5 has a synchronization region for each of data processes in which start timings have to be synchronized and adjusts the start timings by using the synchronization region. The other configurations and operations are similar to those of the multiprocessor system 1. Concretely, the multiprocessor system 5 has, in place of the synchronization region 121, a first synchronization region 501 corresponding to the video processing system 20 and a second synchronization region 502 corresponding to the audio processing system 21. In each of the first synchronization region 501 and the second synchronization region 502, a value expressing whether a process corresponding to the region can be executed or not is stored. Rewriting of data in the first synchronization region 501 or the second synchronization region 502 is permitted only to a corresponding processing system, and reading of data is permitted to both of the processing systems.

Figure 13:
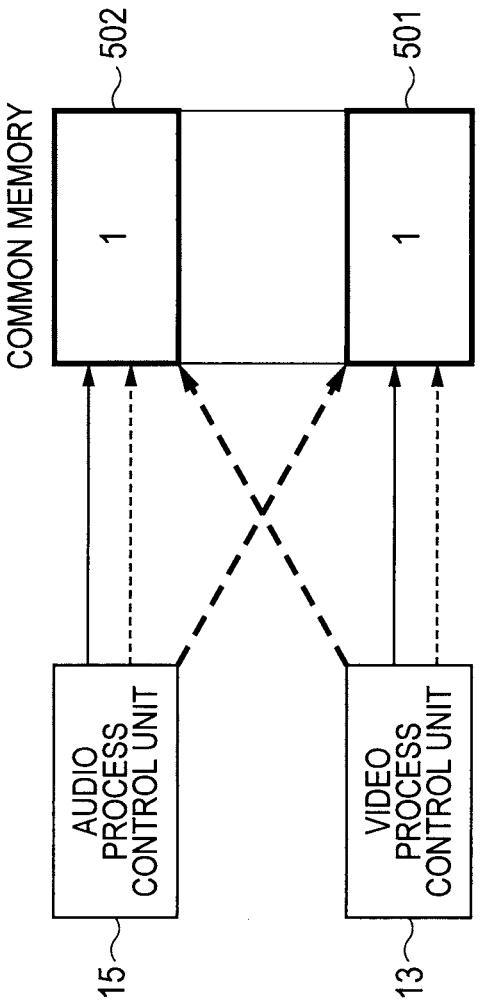
FIG. 13 is an explanatory diagram showing an example of a method of adjusting start timings of data processes using a first synchronization region 501 and a second synchronization region 502.

FIG. 13 shows an example of a method of adjusting start timings of data processes using the first synchronization region 501 and the second synchronization region 502. As shown in the diagram, "1" is preliminarily set as an initial value in each of the first and second synchronization regions 501 and 502. The video process control unit 13 and the audio process control unit 15 accesses the first synchronization region 501 and the second synchronization region 502, respectively, in the memory unit 10 after completion of preparation for starting the decoding process of themselves and, when the values in both of the regions become "0", start their decoding processes.

For example, on completion of preparation of the video stream data decoding process, the video process control unit 13 decrements the value of the first synchronization region 501 to "0". The video process control unit 13 waits until the value of the second synchronization region 502 becomes "0". The waiting is realized by, for example, a busy loop or polling at predetermined time intervals. The predetermined time interval is, for example, a time interval to a degree that the viewer cannot recognize the deviation between sound and a video image. On the other hand, after completion of preparation of the audio stream data decoding process, the audio process control unit 15 decrements the value in the second synchronization region 502 to "0". When the video process control unit 13 and the audio process control unit 15 recognize that the value becomes "0" in both of the first and second synchronization regions 501 and 502, each of the units starts the decoding process. Specifically, the video process control unit 13 instructs the video decoder 142 and the video hardware clock 141 to start operating, and the audio process control unit 15 instructs the audio decoder 162 and the audio hardware clock 161 to start operating. Consequently, in a manner similar to the first embodiment, the start timing of the audio data decoding process and that of the video data decoding process can be synchronized. To realize the method, by using a semaphore for the value in a synchronization region corresponding to the other processing system to be monitored, the processes can be synchronized without increasing the process load on the CPU.

In the method of adjusting the start timings using the first and second synchronization regions 501 and 502, a deadlock may occur depending on the procedure.

Figure 14:
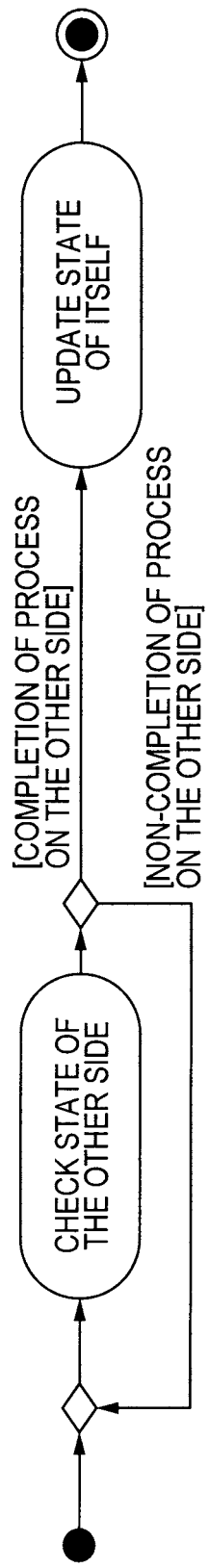
FIG. 14 is an explanatory diagram showing a process flow in the case where a deadlock occurs.

FIG. 14 is an explanatory diagram showing a process flow in the case where a deadlock occurs. As shown in the diagram, in a procedure of checking the state on the other side with which the start timing is to be synchronized and, then, updating a preparation state of itself, an operation is performed after the control units grasp the states of the other sides. Consequently, a change cannot be made from an initial state, and a deadlock occurs. In the multiprocessor system 5, by employing a procedure shown in either FIG. 15 or 16, a deadlock is avoided.

Figure 15:
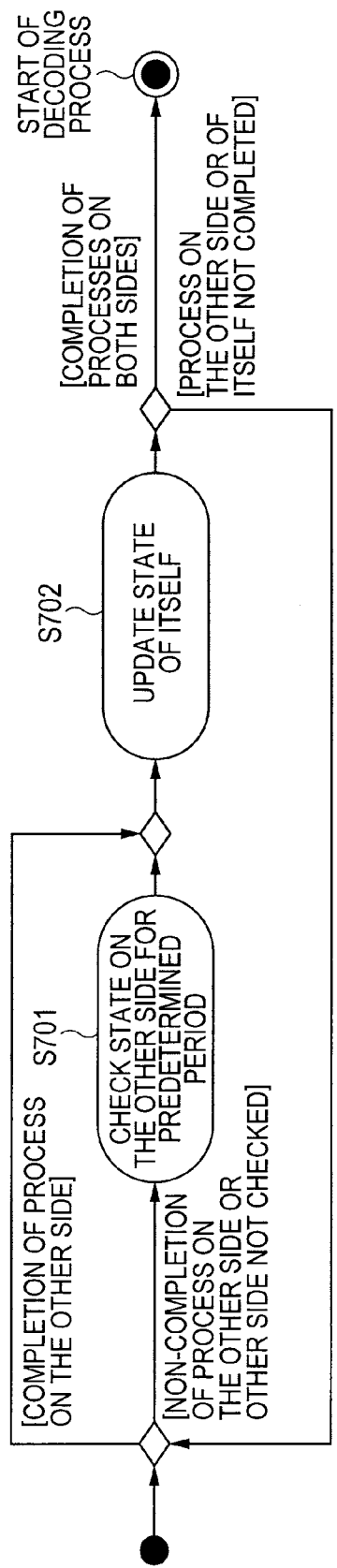
FIG. 15 is an explanatory diagram showing an example of the order of processes for avoiding a deadlock.

FIG. 15 is an explanatory diagram showing an example of the order of processes for avoiding a deadlock.

In the method shown in the diagram, first, a control unit executes a process of checking the state on the other side only for a predetermined period and, after that, updates the preparation state of itself. For example, at the time of executing the video stream data decoding process, first, the video process control unit 13 finishes preparation of the decoding process of itself, then, moves to step 701 (S701), and checks the state on the audio process side with reference to the second synchronization region 502 in the memory unit 50 only for a predetermined period. In the case where the value in the second synchronization region 502 is "0", the video process control unit 13 moves to step 702 (S702), updates the value in the first synchronization region 501 in the memory unit 50 to "0", and start the video stream data deciding process. On the other hand, in the case where the value in the second synchronization region 502 is "1", the video process control unit 13 continues checking the state on the audio process side and, after lapse of the predetermined period, moves to the step 702. For example, the video process control unit 13 executes the process of checking the state on the audio process side at predetermined time intervals and repeats it until a condition is satisfied. After lapse of a predetermined period, the video process control unit 13 updates the value in the first synchronization region 501 to "0" and returns to step 701. By the method, the control unit does not continuously wait for the preparation state on the other side, so that a deadlock can be avoided. When a state where, regardless of the fact that the video process is completed and the value in the first synchronization region 501 is set to "0", the control unit returns to step 701 again and again and the value in the second synchronization region 502 does not become "0" continues for predetermined time or a plurality of times, occurrence of an error is determined. The control unit forcedly finishes the step 701 and executes a process for the error.

Figure 16:
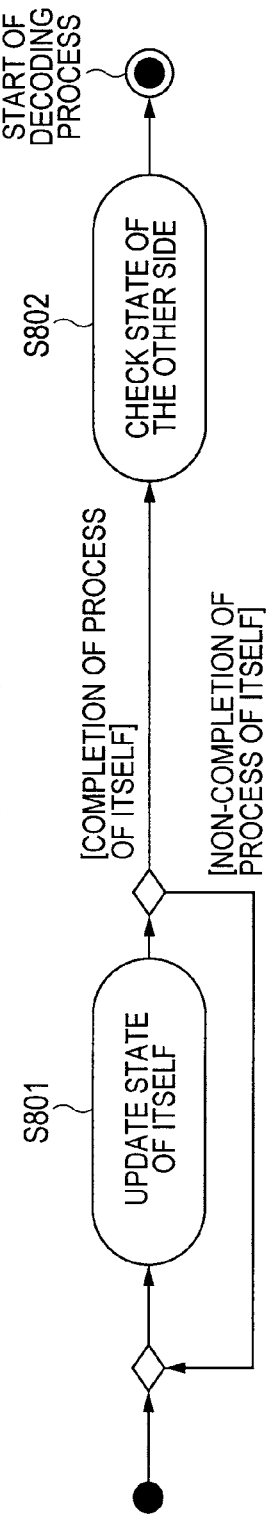
FIG. 16 is an explanatory diagram showing another example of the order of processes for avoiding a deadlock.

FIG. 16 is an explanatory diagram showing another example of the order of processes for avoiding a deadlock.

In the method shown in the diagram, first, a control unit updates the preparation state of itself and, then, checks the preparation state of the other side. For example, at the time of executing the video stream data decoding process, first, the video process control unit 13 finishes preparation of the decoding process, then, moves to step 801 (S801), and updates the value in the first synchronization region 501 in the memory unit 50 to "0". After that, in step 802 (S802), the video process control unit 13 checks the state on the audio process side with reference to the second synchronization region 502 in the memory unit 50. In the case where the value in the second synchronization region 502 is "1", the video process control unit 13 waits until the value in the second synchronization region 502 becomes "0". When the value in the second synchronization region 502 becomes "0", the video process control unit 13 starts the video stream data decoding process. According to the method, the control unit updates the preparation state of itself and waits for completion of preparation of the other side, so that a deadlock can be avoided. In the case where a state where the value of the second synchronization region 502 does not become "0" continues for predetermined time in step 802, occurrence of an error is determined. The control unit forcedly finishes the step 802 and executes a process for the error.

As described above, in the multiprocessor system 5 in the second embodiment, in a manner similar to the first embodiment, content can be reproduced without causing deterioration in a moving image. Also in the case where the reproduction start position of moving image content is designated, timings of sound and a video image are synchronized and reproduction can be started.

Although the invention achieved by the inventors herein has been concretely described on the basis of the embodiments, obviously, the invention is not limited to the embodiments and can be variously changed without departing from the gist.

For example, each of the multiprocessor systems 1 and 5 is not limited to the above-described single-chip configuration but may have a multi-chip configuration.

Although the case of performing the adjustment of the output timings of the decoding process results based on the deviation amount of the lapse times by the video processing system 20 is described in the first embodiment, the invention is not limited to the case. The adjustment may be executed by the audio processing system 21.

Further, in the first embodiment, the adjustment of the output timings in the case of reproduction in the middle is executed by the audio processing system 21. However, the invention is not limited to the example. The adjustment may be performed by the video processing system 20. For example, in the case of setting the head position of the audio frame 207 as the reproduction start position, the video decoder 142 shortens the reproduction time of the frame 205 and outputs the frame to the video data display unit 3. Consequently, in a manner similar to the above, also in the case of reproduction in the middle, the timings of sound and a video image are synchronized and reproduction can be started.

What is claimed is:

1. A data processing system for receiving contents including
    a first data stream and a second data stream, processing data of contents and outputting results of data process, comprising:
    a first processor configured to process data of the first data stream;
    a second processor configured to process data of the second data stream;
    a memory configured to be accessed by the first processor and the second processor and, having a first information storing a value controlling execution of data process;
    a first output configured to output a result of data process of the first data stream; and
    a second output configured to output a result of data process of the second data stream, wherein each of the first processor and the second processor updates the first information on completion of preparation for executing the data process of itself and, wherein the first processor and the second processor start their data process when the first information becomes a predetermined value, the first processor further comprising:

a first reference clock generator configured to generate a first reference time expressing lapse time since start of the data process based on a first operation clock supplied to itself; and a first controller configured to update the first information and to store the first reference time in the memory, the second processor further comprising:

a second reference clock generator configured to generate a second reference time expressing lapse time since start of the data process based on a second operation clock supplied to itself; and a second controller configured to update the first information and to store the second reference time in the memory, wherein the first controller is configured to start the first reference clock generator on confirmation that the first information becomes the predetermined value, wherein the second controller is configured to start the second reference clock generator on confirmation that the first information becomes the predetermined value, wherein the first controller comprises a first data processor and is configured to read the first reference time and the second reference time stored in the memory and calculate a first adjusting time from the first reference time and the second reference time, wherein the first data processor is configured to adjust the timing of starting the data processes based on the first adjusting time.

2. The data processing system according to claim 1, wherein each of the first data stream and the second data stream has a plurality of frames and one frame is a unit of data process, wherein each of frames includes first data or second data, and time information instructing a timing of outputting a result of data process, the first data processor configured to start the first data process by instructing from the first controller, and output the result of data process of the first data to the first output, the second processor further comprising:

a second data processor configured to start the second data process by instructing from the second controller, and output the result of data process of the second data to the second output.

3. The data processing system according to claim 2, wherein the first data processor is configured to adjust the timing to output to the first output based on the first adjusting time.

4. The data processing system according to claim 2, wherein the second controller is configured to read the first reference time and the second reference time stored in the memory and calculate a second adjusting time from the first reference time and the second reference time, wherein the second data processor is configured to adjust the timing of starting the data processes based on the second adjusting time.

5. The data processing system according to claim 2, wherein the second controller is configured to read the first reference time and the second reference time stored in the memory and calculate a second adjusting time from the first reference time and the second reference time, wherein the second data processor is configured to adjust the timing to output to the second output based on the second adjusting time.

6. The data processing system according to claim 1, wherein each of the first controller and the second controller is configured to update the value by incrementing from the predetermined value in the case of stopping execution of its data processing.

7. A data processing system for receiving contents including a first data stream and a second data stream, processing data of contents and outputting results of data process, comprising:

a first processor configured to process data of the first data stream;

a second processor configured to process data of the second data stream;

a memory configured to be accessed by the first processor and the second processor and, having a first information storing a value controlling execution of data process;

a first output configured to output a result of data process of the first data stream; and a second output configured to output a result of data process of the second data stream, wherein each of the first processor and the second processor updates the first information on completion of preparation for executing the data process of itself and, wherein the first processor and the second processor start their data process when the first information becomes a predetermined value, the first processor further comprising:

a first reference clock generator configured to generate a first reference time expressing lapse time since start of the data process based on a first operation clock supplied to itself; and a first controller configured to update the first information and to store the first reference time in the memory, the second processor further comprising:

a second reference clock generator configured to generate a second reference time expressing lapse time since start of the data process based on a second operation clock supplied to itself; and a second controller configured to update the first information and to store the second reference time in the memory, wherein the first controller is configured to start the first reference clock generator on confirmation that the first information becomes the predetermined value, wherein the second controller is configured to start the second reference clock generator on confirmation that the first information becomes the predetermined value, wherein an initial value of the first information is set according to the number of the first processor and the second processor, wherein each of the first controller and the second controller is configured to update the first information by decrementing on completion of preparation for executing the data process of itself, and wherein the predetermined value is a value indicative of zero.

8. A data processing system for receiving contents including a first data stream and a second data stream, processing data of contents and outputting results of data process, comprising:

a first processor configured to process data of the first data stream;
a second processor configured to process data of the second data stream;
a memory configured to be accessed by the first processor and the second processor and, having a first information storing a value controlling execution of data process;
a first output configured to output a result of data process of the first data stream; and
a second output configured to output a result of data process of the second data stream,
wherein each of the first processor and the second processor updates the first information on completion of preparation for executing the data process of itself and,
wherein the first processor and the second processor start their data process when the first information becomes a predetermined value,
the first processor further comprising:
a first reference clock generator configured to generate a first reference time expressing lapse time since start of the data process based on a first operation clock supplied to itself; and
a first controller configured to update the first information and to store the first reference time in the memory,
the second processor further comprising:
a second reference clock generator configured to generate a second reference time expressing lapse time since start of the data process based on a second operation clock supplied to itself; and
a second controller configured to update the first information and to store the second reference time in the memory,
wherein the first controller is configured to start the first reference clock generator on confirmation that the first information becomes the predetermined value,
wherein the second controller is configured to start the second reference clock generator on confirmation that the first information becomes the predetermined value,
wherein the first reference time and the second reference time are values counted every time which is based on a least common multiple of time of one cycle of the first operation clock and time of one cycle of the second operation reference clock.

9. A video and audio processing system for receiving contents including a video stream and an audio stream, processing data of contents and outputting results of data process, comprising:
a video processor configured to process data of the video stream;
an audio processor configured to process data of the audio stream;
a memory configured to be accessed by the video processor and the audio processor and, having a first information storing a value controlling execution of data process;
a video output configured to output a result of data process of the video stream; and
an audio output configured to output a result of data process of the audio data stream,
wherein each of the video processor and the audio processor updates the first information on completion of preparation for executing the data process of itself and,
wherein the video processor and the audio processor start the data process when the first information becomes a predetermined value, the video processor further comprising:
a first reference clock generator configured to generate a first reference time expressing lapse time since start of the data process based on a first operation clock supplied to itself; and
a first controller configured to update the first information and to store the first reference time in the memory,
the audio processor further comprising:
a second reference clock generator configured to generate a second reference time expressing lapse time since start of the data process based on a second operation clock supplied to itself; and
a second controller configured to update the first information and to store the second reference time in the memory,
wherein the first controller is configured to start the first reference clock generator on confirmation that the first information becomes the predetermined value,
wherein the second controller is configured to start the second reference clock generator on confirmation that the first information becomes the predetermined value,
wherein the first controller comprises a first data processor and is configured to read the first reference time and the second reference time stored in the memory and calculate a first adjusting time from the first reference time and the second reference time,
wherein the first data processor is configured to adjust the timing of starting the data processes based on the first adjusting time.

10. The video and audio processing system according to claim 9,
wherein each of the video stream and audio stream has a plurality of frames and one frame is a unit of data process,
wherein each of frames includes video data or audio data, and time information instructing a timing of outputting a result of data process,
the first data processor configured to start the video data process by instructing from the first controller, and output the result of data process of video data to the video output,
the audio processor further comprising:
a second data processor configured to start the audio data process by instructing from the second controller, and output the result of data process of audio data to the audio output.

11. The video and audio processing system according to claim 10,
wherein the first data processor is configured to adjust the timing to output to the video output based on the first adjusting time.

12. The video and audio processing system according to claim 10,
wherein the second controller is configured to read the first reference time and the second reference time stored in the memory and calculate a second adjusting time from the first reference time and the second reference time,
wherein the second data processor is configured to adjust the timing of starting the data processes based on the second adjusting time.

13. The video and audio processing system according to claim 10,
wherein the second controller is configured to read the first reference time and the second reference time stored in the memory and calculate a second adjusting time from the first reference time and the second reference time, wherein the second data processor is configured to adjust the timing to output to the audio output based on the second adjusting time.

14. The video and audio processing system according to claim 9,
wherein each of the first controller and the second controller is configured to update the value by incrementing from the predetermined value in the case of stopping execution of its data processing.

15. A video and audio processing system for receiving contents including a video stream and an audio stream, processing data of contents and outputting results of data process, comprising:
a video processor configured to process data of the video stream;
an audio processor configured to process data of the audio stream;
a memory configured to be accessed by the video processor and the audio processor and, having a first information storing a value controlling execution of data process;
a video output configured to output a result of data process of the video stream; and
an audio output configured to output a result of data process of the audio stream,
wherein each of the video processor and the audio processor updates the first information on completion of preparation for executing the data process of itself and,
wherein the video processor and the audio processor start the data process when the first information becomes a predetermined value,
the video processor further comprising:
a first reference clock generator configured to generate a first reference time expressing lapse time since start of the data process based on a first operation clock supplied to itself; and
a first controller configured to update the first information and to store the first reference time in the memory,
the audio processor further comprising:
a second reference clock generator configured to generate a second reference time expressing lapse time since start of the data process based on a second operation clock supplied to itself; and
a second controller configured to update the first information and to store the second reference time in the memory,
wherein the first controller is configured to start the first reference clock generator on confirmation that the first information becomes the predetermined value,
wherein the second controller is configured to start the second reference clock generator on confirmation that the first information becomes the predetermined value,
wherein an initial value of the first information is set according to the number of the video processor and the audio processor,
wherein each of the first controller and the second controller is configured to update the first information by decrementing on completion of preparation for executing the data process of itself, and
wherein the predetermined value is a value indicative of zero.

16. A video and audio processing system for receiving contents including a video stream and an audio stream, processing data of contents and outputting results of data process, comprising:
a video processor configured to process data of the video stream;
an audio processor configured to process data of the audio stream;
a memory configured to be accessed by the video processor and the audio processor and, having a first information storing a value controlling execution of data process;
a video output configured to output a result of data process of the video stream; and
an audio output configured to output a result of data process of the audio stream,
wherein each of the video processor and the audio processor updates the first information on completion of preparation for executing the data process of itself and,
wherein the video processor and the audio processor start the data process when the first information becomes a predetermined value,
the video processor further comprising:
a first reference clock generator configured to generate a first reference time expressing lapse time since start of the data process based on a first operation clock supplied to itself; and
a first controller configured to update the first information and to store the first reference time in the memory,
the audio processor further comprising:
a second reference clock generator configured to generate a second reference time expressing lapse time since start of the data process based on a second operation clock supplied to itself; and
a second controller configured to update the first information and to store the second reference time in the memory,
wherein the first controller is configured to start the first reference clock generator on confirmation that the first information becomes the predetermined value,
wherein the second controller is configured to start the second reference clock generator on confirmation that the first information becomes the predetermined value,
wherein the first reference time and the second reference time are values counted every time which is based on a least common multiple of time of one cycle of the first operation clock and time of one cycle of the second operation reference clock.

* * * * *